(12) United States Patent
Verduzco et al.

(10) Patent No.: US 11,739,010 B2
(45) Date of Patent: Aug. 29, 2023

(54) ELECTRODES FOR SELECTIVE REMOVAL OF MULTIVALENT IONS THROUGH CAPACITIVE DEIONIZATION

(71) Applicant: William Marsh Rice University, Houston, TX (US)

(72) Inventors: Rafael Verduzco, Houston, TX (US); Amit Jain, Houston, TX (US); Jun Kim, Houston, TX (US); Qilin Li, Houston, TX (US); Kuichang Zuo, Houston, TX (US)

(73) Assignee: William Marsh Rice University, Houston, TX (US)

( * ) Notice: Subject to any disclaimer, the term of this patent is extended or adjusted under 35 U.S.C. 154(b) by 967 days.

(21) Appl. No.: 16/533,402

(22) Filed: Aug. 6, 2019

(65) Prior Publication Data
US 2020/0071200 A1    Mar. 5, 2020

Related U.S. Application Data

(60) Provisional application No. 62/715,116, filed on Aug. 6, 2018.

(51) Int. Cl.
*C02F 1/469*     (2023.01)
*B01D 15/36*    (2006.01)
*C02F 1/461*    (2023.01)

(52) U.S. Cl.
CPC .......... *C02F 1/4691* (2013.01); *B01D 15/362* (2013.01); *B01D 15/363* (2013.01); *C02F 1/46114* (2013.01)

(58) Field of Classification Search
CPC .......................... C02F 1/4691; B01D 15/362
See application file for complete search history.

(56) References Cited

U.S. PATENT DOCUMENTS

| | | | |
|---|---|---|---|
| 9,771,282 B2* | 9/2017 | Cho | C02F 1/4691 |
| 10,376,874 B2* | 8/2019 | Choi | C08F 20/58 |
| 10,626,028 B2* | 4/2020 | Mayes | C02F 1/4691 |
| 2016/0272515 A1* | 9/2016 | Choi | C25B 11/04 |

* cited by examiner

*Primary Examiner* — Sikarl A Witherspoon
(74) *Attorney, Agent, or Firm* — Osha Bergman Watanabe & Burton LLP

(57) ABSTRACT

A method of forming an electrode for capacitive deionization includes depositing an slurry onto a substrate, wherein the slurry comprises a porous material, a first crosslinkable hydrophilic polymer, and a crosslinker for the first crosslinkable hydrophilic polymer; annealing the slurry deposited on the substrate to create a crosslinked porous layer on the substrate; depositing a solution comprising an ion-exchange material, a second crosslinkable hydrophilic polymer, and a crosslinker for the second crosslinkable hydrophilic polymer onto the crosslinked porous layer; and optionally annealing and/or drying the solution on the crosslinked porous layer.

17 Claims, 25 Drawing Sheets

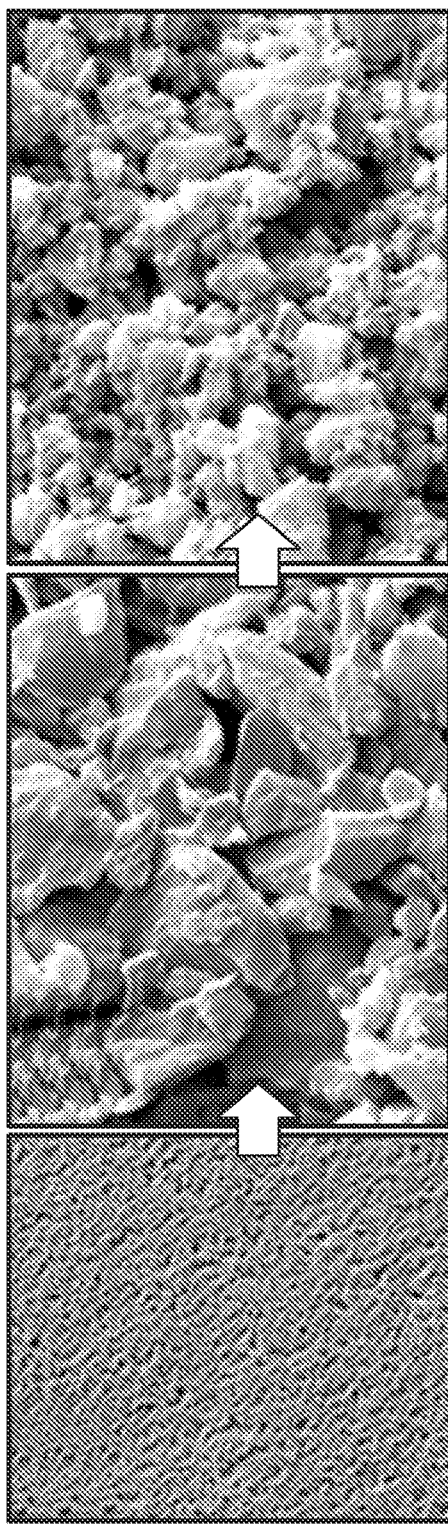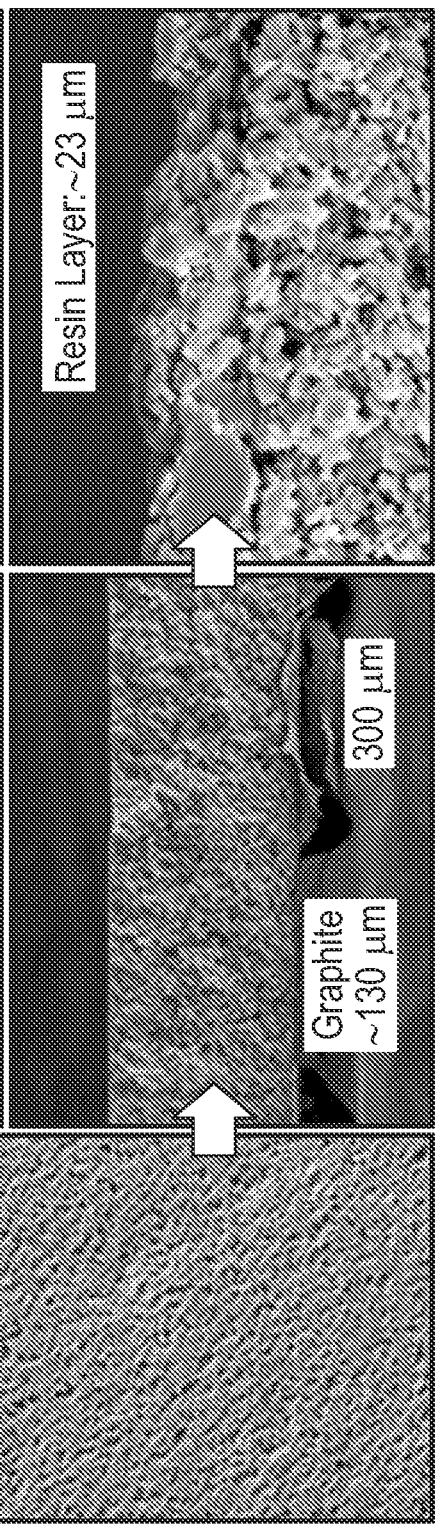
FIG. 15A FIG. 15B FIG. 15C FIG. 15D FIG. 15E

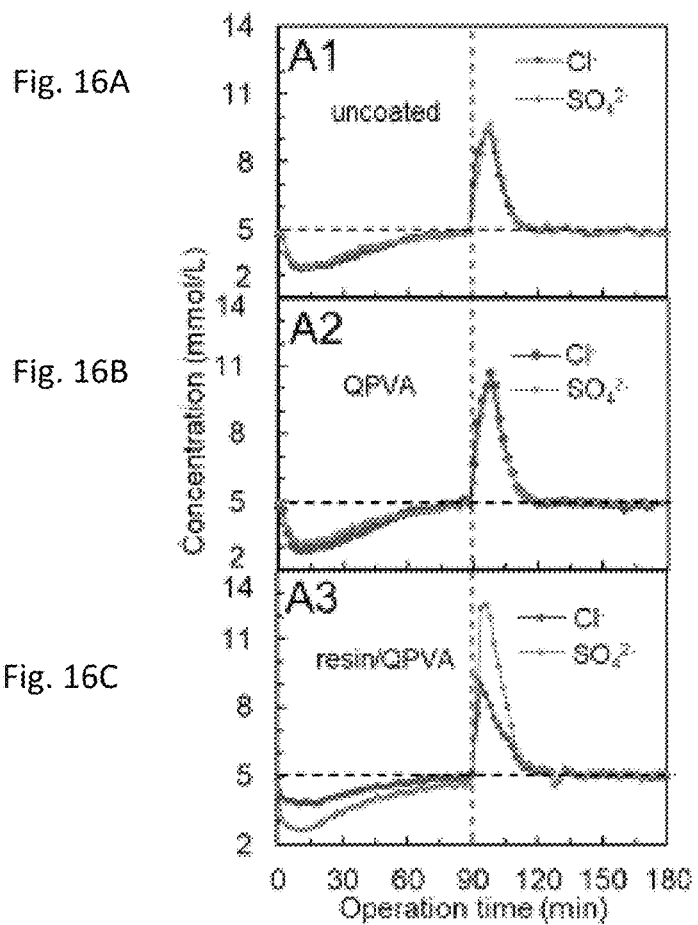
Fig. 16A
Fig. 16B
Fig. 16C
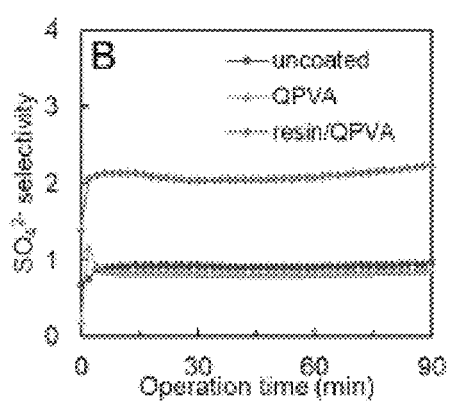
Fig. 16D
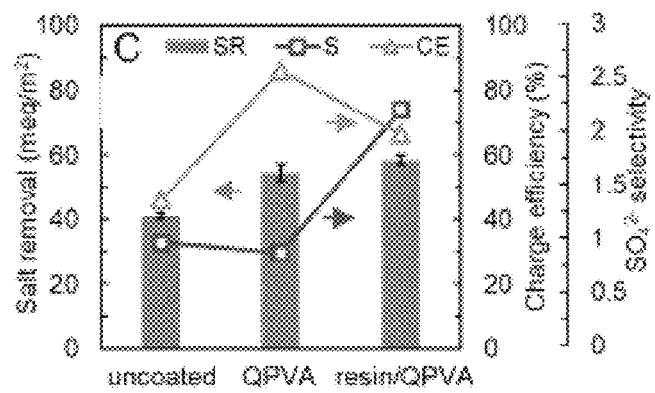
Fig. 16E

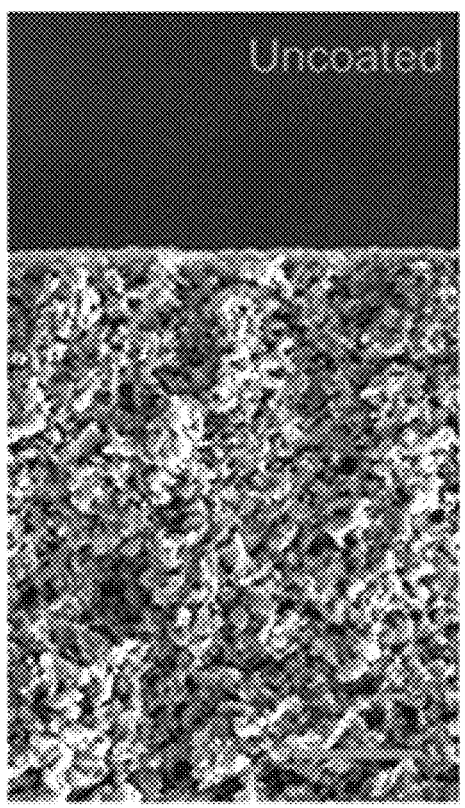
Fig. 17A
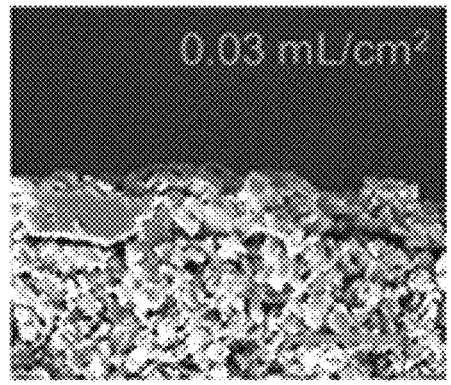
Fig. 17B
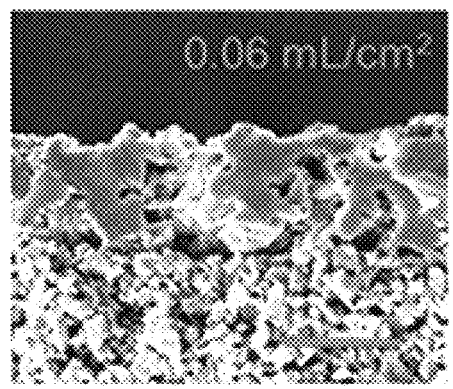
Fig. 17C
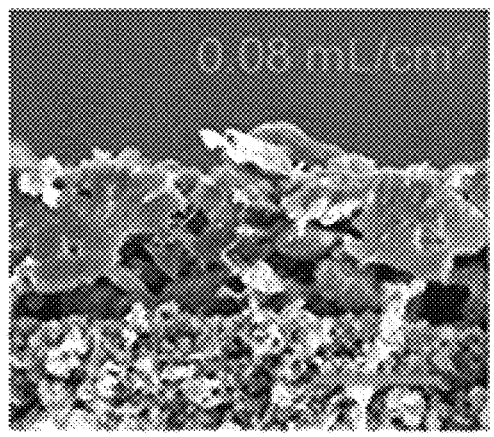 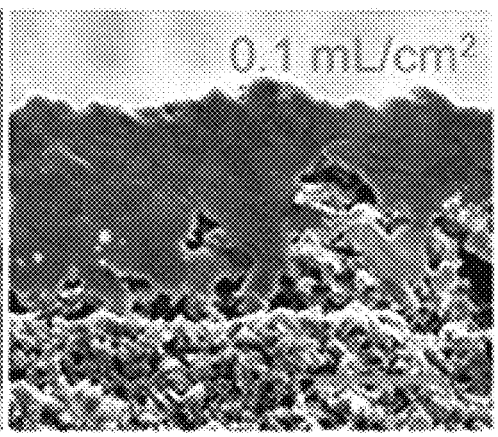
Fig. 17D          Fig. 17E Fig. 19A
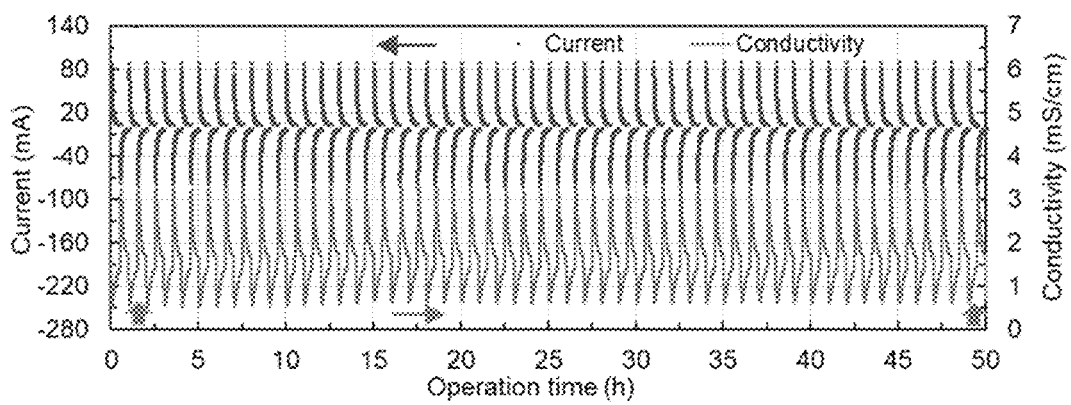
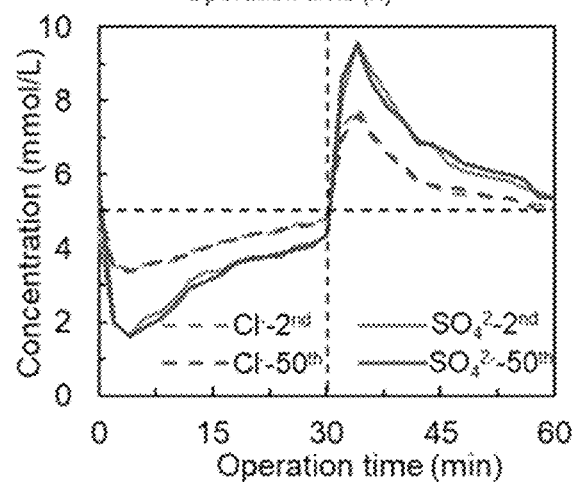
Fig. 19B
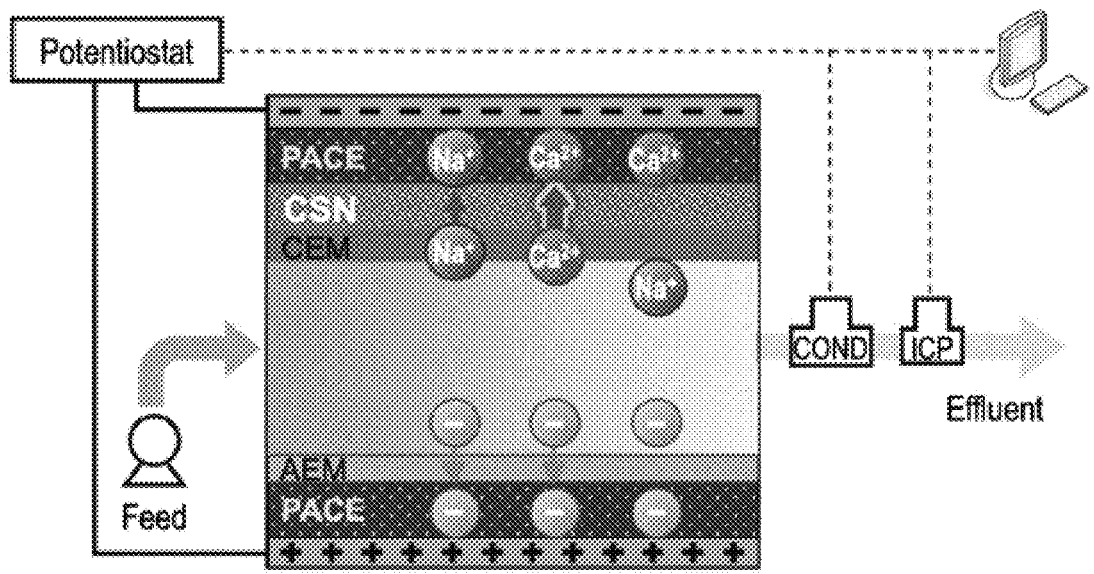
FIG. 20

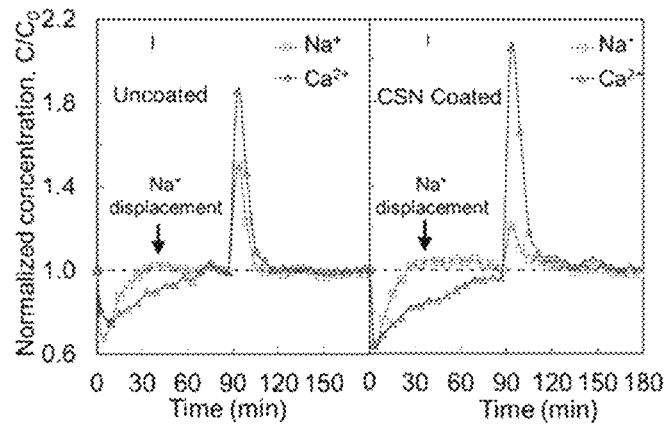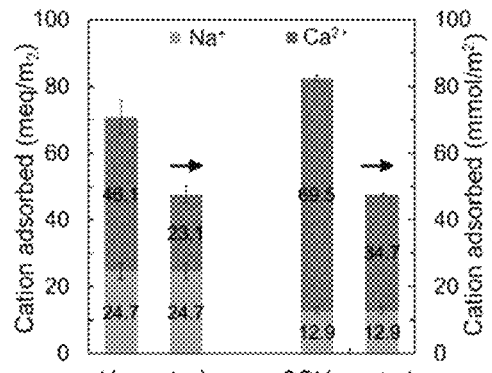
FIG. 24

ELECTRODES FOR SELECTIVE REMOVAL OF MULTIVALENT IONS THROUGH CAPACITIVE DEIONIZATION

CROSS-REFERENCE TO RELATED APPLICATIONS

This Application claims the benefit of U.S. Provisional Application 62/715,116 filed on Aug. 6, 2018.

STATEMENT REGARDING FEDERALLY SPONSORED RESEARCH OR DEVELOPMENT

This invention was made with government support under Grant No. EEC-1449500, awarded by the National Science Foundation Nanosystems Engineering Research Center for Nanotechnology-Enabled Water Treatment. The government has certain rights in the invention.

BACKGROUND

Private support was also received under: Grant Numbers C-1888 awarded by the Welch Foundation. Capacitive deionization (CDI) is an approach for water desalination involving the reversible removal of ions by application of an electric potential between two electrodes. CDI is an emerging desalination technology that utilizes porous electrodes charged with a low electric potential to remove ionic species from aqueous solution through electrosorption. The electric field drives ions to the electrodes resulting in a stream of deionized water. CDI is a low-cost alternative desalination process to pressure based membrane desalination and thermal desalination methods. Ion-exchange membranes may be placed in front of the electrodes to prevent the passage of co-ions and improve the overall salt removal and charge efficiency. When the ion-exchange membranes are used, the process may be referred to as membrane capacitive deionization (MCDI).

The desalination performance and charge efficiency have also been improved through packing ion exchange resins or activated carbon between two electrodes to increase bulk conductivity, utilizing the flow through operation mode to enhance adsorption kinetics, optimizing electrical or hydraulic adsorption/desorption cycles, and coupling Faradaic pseudo capacitance.

In CDI, an electrical potential applied between porous electrodes drives the reversible electrosorption of ions. In MCDI, ion-exchange membranes are placed in front of the electrodes, as shown schematically in FIGS. 1A and 1B. The advantages of MCDI over CDI include an increase in the overall salt removal and charge efficiency due to blocking of co-ions and preventing or minimizing Faradaic reactions at the electrode surface that can degrade performance.

CDI has been studied for desalination of seawater, brackish water, and domestic wastewater. It has also been coupled with other processes such as microbial fuel cells and filtration membranes. The adsorption capacity of CDI electrodes has grown from less than 3 to more than 30 mg NaCl per gram of electrode.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of forming an electrode for capacitive deionization that includes depositing an slurry onto a substrate, wherein the slurry comprises a porous material, a first crosslinkable hydrophilic polymer, and a crosslinker for the first crosslinkable hydrophilic polymer; annealing the slurry deposited on the substrate to create a crosslinked porous layer on the substrate; depositing an solution comprising an ion-exchange material, a second crosslinkable hydrophilic polymer, and a crosslinker for the second crosslinkable hydrophilic polymer onto the crosslinked porous layer; and optionally annealing and/or drying the solution on the crosslinked porous layer.

In another aspect, embodiments disclosed herein relate to a method of deionizing an aqueous fluid that includes continuously flowing the aqueous fluid through a capacitive deionization reactor that includes at least one electrode fabricated according to methods described herein while applying a voltage between an anode and a cathode of the capacitive deionization reactor.

In another aspect, embodiments disclosed herein relate to a method of deionizing an aqueous fluid that includes continuously flowing the aqueous fluid through a capacitive deionization reactor that includes at least one electrode fabricated to selectively remove a targeted ion, while applying a voltage between an anode and a cathode of the capacitive deionization reactor.

In yet another aspect, embodiments disclosed herein relate to an apparatus for capacitive deionization reactions that includes a cathode, and an anode, wherein at least one of the anode and/or cathode is a crosslinked porous electrode formed by the method of claim 1. The apparatus further includes wherein the crosslinked porous electrode comprises substrate, a first porous layer deposited on the substrate, and a second layer deposited on the first porous layer; wherein the first porous layer comprises a porous material and a crosslinked hydrophilic polymer, and the second layer comprises an ion exchange material, a crosslinked or non-crosslinked hydrophilic polymer, and optionally a crosslinker.

Other aspects and advantages of the claimed subject matter will be apparent from the following description and the appended claims.

BRIEF DESCRIPTION OF DRAWINGS

FIG. 10A shows ion selectivity for a concentration of $Cl^-$ and $SO_4^{2-}$ with a $Cl^-/SO_4^{2-}$ concentration of 5:5; (FIG. 10B) concentration of $Cl^-$ and $SO_4^{2-}$ with a $Cl^-/SO_4^{2-}$ concentration of 50:5; (FIG. 10C) instant selectivity of $SO_4^{2-}$ over $Cl^-$ during adsorption period.

FIG. 11A shows effluent conductivity over 5 cycles of operation; FIG. 11B shows effluent conductivity over 1 cycle showing the inversion effect for an electrode of Example 2 at the onset of the adsorption cycle (indicated by the circle); FIG. 11C shows a comparison of the PVA and PVDF CDI systems ability to remove or adsorb ions from solution; and FIG. 11D shows salt removal and charge efficiencies for both systems.

FIG. 12A shows effluent conductivity over 5 cycles of operation; FIG. 12B shows effluent conductivity over 1 cycle showing greater uptake for an electrode of Example 3; FIG. 12C shows a comparison of the PVA-CDI and PVA-PC-MCDI systems ability to remove or adsorb ions from solution; and FIG. 12D shows salt removal and charge efficiencies for both systems comparatively.

FIG. 13A shows effluent conductivity over 5 cycles of operation; FIG. 13B shows effluent conductivity over 1 cycle showing greater uptake for an electrode of Example 3; FIG. 13C shows a comparison of the PVA-MCDI, PVA-PC-MCDI, and PVDF-MCDI systems ability to remove or adsorb ions from solution; and FIG. 13D shows salt removal and charge efficiencies of the three systems comparatively.

FIGS. 15A-F show (FIGS. 15A-15C) SEM images of surface and cross-sections of an uncoated carbon electrode; while FIGS. 15D and 15E show SEM images of surface and cross-sections of a selective nano-sorbent resin/QPVA coated electrode, respectively. FIG. 15F shows an FTIR spectra of the different electrode materials. PAC: powered activated carbon; ele: activated carbon electrode.

FIGS. 16A-16E show desalination performance and ion removal in uncoated, QPVA coated, and selective nano-sorbent resin/QPVA coated electrode. FIG. 16A-16C show the concentration change of $Cl^-$ and $SO_4^{2-}$ during an adsorption and desorption cycle for each electrode; while FIG. 16D shows $SO_4^{2-}$ selectivity during adsorption period; and FIG. 16E shows salt removal (SR), charge efficiency (CE), and $SO_4^{2-}$ selectivity (S) of the three electrodes. Arrows in panel A and C represent corresponding axis.

FIGS. 17A-17E show SEM images of carbon electrodes coated with various amounts of selective nano-sorbent resin slurry as noted in the images. The scale bar in panel A represents 40 μm.

FIG. 18A shows conductivity of CDI effluent during adsorption period; (FIG. 18B) total salt removal, current production, and anion removal during adsorption period; and (FIG. 18C) charge efficiency and $SO_4^{2-}$ selectivity. Arrows in panel C and D represent corresponding axis.

FIGS. 19A-19B show the long-term stability of the selective nano-sorbent resin/QPVA coated electrode during 50 cycles of operation. FIG. 19A shows current and conductivity of CDI effluent; FIG. 19B shows $Cl^-$ and $SO_4^{2-}$ evolution during the 2nd and 50th cycle.

FIG. 20 shows a schematic diagram of the experimental setup used in Study 4. (CSN: $Ca^{2+}$ selective nanocomposite, PACE: powdered activated carbon electrode; COND: conductivity sensor; ICP: inductively coupled plasma spectroscopy).

FIG. 21E shows FTIR spectra of uncoated, PVA/GA/SSA-coated, pure resin, and the— CSN coated electrode.

(FIG. 22B) conductivity profile during one adsorption stage; (FIG. 22C) conductivity profile during one desorption stage, with insert illustrating desorption at a microscopic scale; and (FIG. 22D) salt adsorption capacity and charge efficiency of uncoated and CSN electrodes in single NaCl or $CaCl_2$ solution.

FIGS. 23A-23C show (FIG. 23A-23B) concentration profiles of $Na^+$ and $Ca^{2+}$ during an adsorption/desorption cycle using the uncoated (FIG. 23A) and CSN coated (FIG. 23B) electrodes at an initial $Na^+$-to-$Ca^{2+}$ equivalent ratio of 1:1; (FIG. 23C) cations adsorbed by uncoated and CSN electrodes at an influent $Na^+$-to-$Ca^{2+}$ equivalent ratio of 1:1.

FIG. 24 shows Ion-transport of $Na^+$ and $Ca^{2+}$ through the CSN layer in the electro-dialysis experiment.

DETAILED DESCRIPTION

Embodiments disclosed herein relate generally towards ion selective polymer coated electrodes and methods of making and using the same in CDI or MCDI devices. For ease of reading "CDI" and "MCDI" will be used interchangeably herein, and the ion selective polymer coated electrodes described herein may be utilized in either process. The ion selective polymer coated electrodes may be used in MCDI devices to selectively remove multivalent cations and/or anions. The desalination performance and charge efficiency may be improved through packing ion exchange resins or activated carbon between two electrodes to increase bulk conductivity, utilizing the flow through operation mode to enhance adsorption kinetics, optimizing electrical or hydraulic adsorption/desorption cycles, and coupling Faradaic pseudo capacitance.

More than one embodiment presented herein may relate to electrodes fabricated for deionization processes. However, it should be noted that such electrodes prepared in accordance with one or more embodiments presented herein may be used in a variety of electrosorption applications.

Electrodes used in CDI and MCDI may be comprised of a porous active material, an optional conductive additive, polymeric binder, and optional ion-exchange polymeric coatings wherein the ion-exchange coating may comprise selective ion-exchange nanoparticles. Significant work has been focused on the development of highly-porous active materials to increase charge storage capacities so that the ion removal capacity may be increased. However, conventional desalination and/or capacitive deionization processes do not have any selectivity for multivalent ions, which are commonly the most problematic as they are corrosive and contribute significantly to fouling and scaling of surfaces, membranes, pipes, etc.

Figures 1A, 1B:
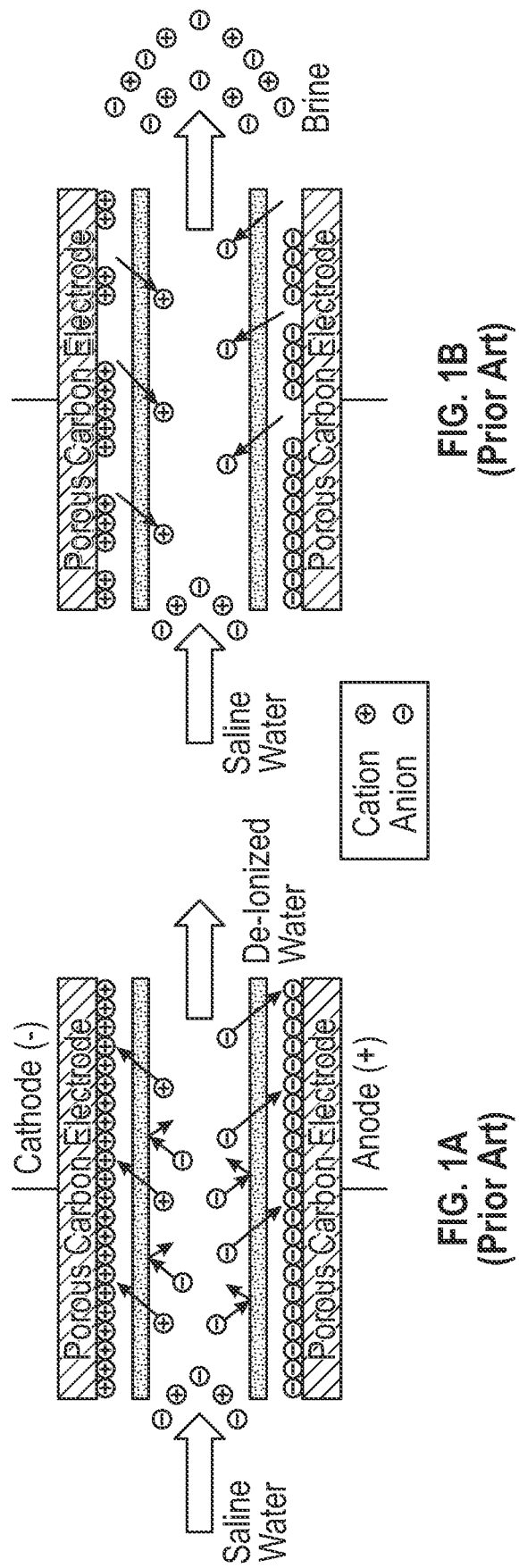
FIGS. 1A-1B show a schematic for MCDI operation during (FIG. 1A) ion uptake and (FIG. 1B) ion desorption.
Figure 2:
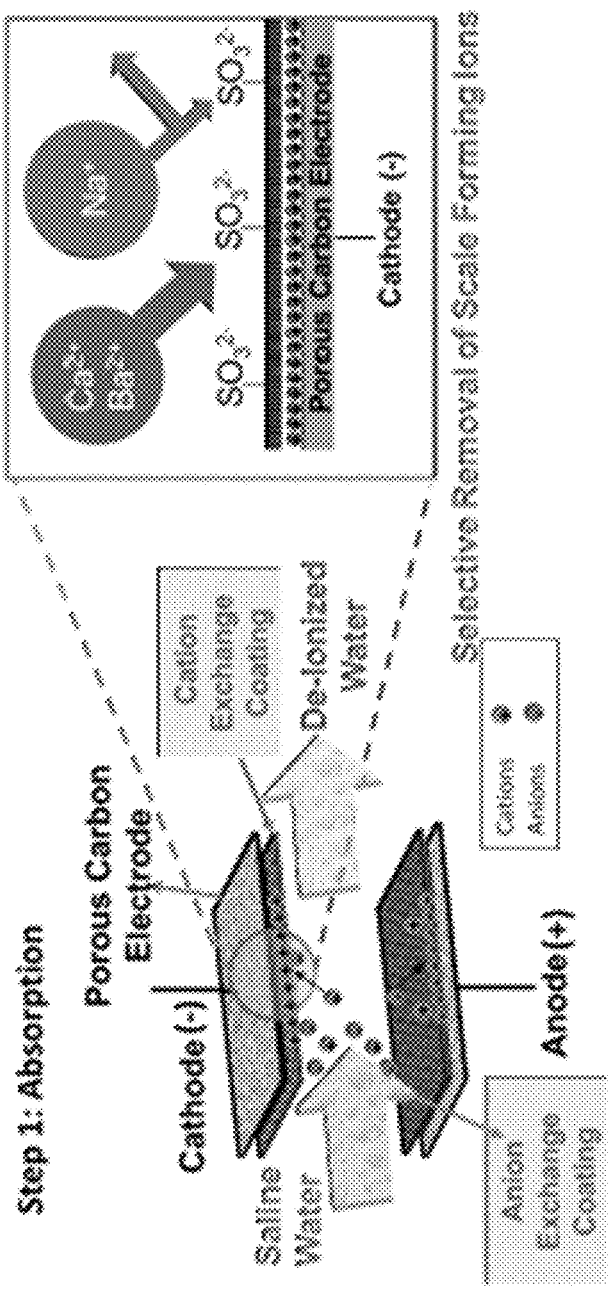
FIG. 2 shows a schematic illustrating the concept of selective cation removal.

Ion selective polymer coated electrodes disclosed herein may be used to selectively remove harmful/undesirable ionic contaminants from aqueous fluids (e.g., drinking water), as shown in FIG. 2. For example, some harmful/undesirable ions may include heavy metals, fluoride, and oxyanions. More specifically, some harmful/undesirable ions may include, but are not limited to, chromate, sulfate, $Li^+$, $Sr^{2+}$, $Ca^{2+}$, $Ba^{2+}$, $Cu^{2+}$, $Pb^{2+}$, $As(V)$, $Cr(VI)$, and $NO_3^-$. In one or more embodiments, the ion selective electrodes may have tailored chemical compositions that can target specific contaminants for preferential removal during CDI processes.

Further, the material for polymeric binder and/or ion-exchange polymer coating in electrodes plays an important role in determining ion permeability and mechanical properties of electrodes in CDI processes. The material selection for the binder and the polymer coating also influences the solvents that can be used during the fabrication and processing of CDI electrodes. Polymeric binding material used to fabricate electrodes may include, for example, poly(vinylidene fluoride) (PVDF) or polytetrafluoroethylene (PTFE) organic polymers which are insoluble in water. In many cases, CDI fabrication methods may use organic solvents to solubilize the PVDF and/or PTFE binders. Moreover, solvents may also be used for processing ion-exchange polymer coatings, as they may find use for solubilizing the polymer resins used in the coating.

Significantly, the organic solvents used in conventional CDI fabrication techniques may not be completely removed during fabrication (even after a drying process), and thus residual organic solvents have the potential to leach out during operation of the system, thereby contaminating the de-ionized fluid product and potentially adversely impacting the drinking water application of such systems. Thus, an alternative process for fabricating electrodes and ion-exchange layers for MCDI that does not rely on organic solvents would be desirable to simplify the fabrication process, reduce electrode size and weight, and avoid the use of organic solvents. The ion-selective electrodes described herein may be fabricated using a purely water-based process (i.e., no organic solvents used for both binder and coating), and therefore are safer and more environmentally friendly.

One or more embodiments herein relate to preparing ion selective polymer coated electrodes through the procedures detailed below and extending its application for the selective removal of monovalent multivalent cations/anions as opposed to conventional desalination processes which do not have any selectivity. One or more embodiments may be directed to an approach that utilizes water-soluble polyvinyl alcohol (PVA) along with crosslinkers as binders, as well as ion selective polymer coatings for MCDI electrodes. Additionally, both the electrodes as well as coatings may be deposited using simple and scalable flow coating methods.

Figure 3:
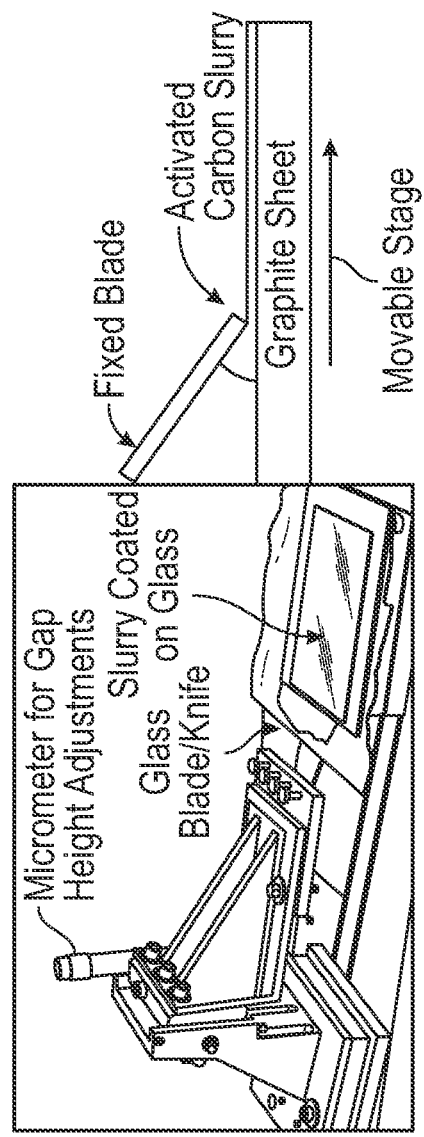
FIG. 3 shows a flow coating setup and flow coating mechanism with a movable stage.

The devices prepared in accordance with one or more embodiments herein may be fabricated to selectively remove monovalent as well as multi-valent ions from an aqueous sample that contains a blend of monovalent and divalent ions. The selective removal of monovalent and multivalent ions may be more cost-effective compared with full de-ionization that removes the most undesirable contaminants in water, including potential scalants, foulants, and precipitants for downstream processes In one or more embodiments electrodes may be prepared by depositing an aqueous slurry of activated carbon, water soluble crosslinker, and a crosslinkable polymer on a flat substrate. One example, as shown in FIG. 3, shows a flow coating setup and flow coating mechanism. Cation and anion selectivity may be achieved by modifying the as prepared cathode and anode respectively.

One or more embodiments herein further relate to CDI device configurations that include flow-by, flow-through, flow, faradaic, inverse-, hybrid, and intercalating CDI structures both with and without membranes.

Aqueous Slurry

In one or more embodiments, a method of forming an electrode for capacitive deionization may include depositing an aqueous slurry onto a substrate, wherein the aqueous slurry comprises a porous material, a first crosslinkable hydrophilic polymer, and a crosslinker for the first crosslinkable hydrophilic polymer. In one or more embodiments, a method of forming an electrode for capacitive deionization may include annealing the aqueous slurry deposited on the substrate to create a crosslinked porous layer on the substrate.

In one or more embodiments, each component of the aqueous slurry may be included in an amount from 0.1 to 100% by weight. In one or more embodiments, on a solids weight percent basis, the porous material may be in the range of 80 to 95 wt % and the hydrophilic polymer plus crosslinker may be in the range of 0.1 to 50 wt %, or more specifically 5 to 20 wt %. In one or more embodiments, the crosslinker for the first cross-linkable hydrophilic polymer may amount from 0 to 100 mol % with respect to the moles of cross-linkable groups on the first cross-linkable polymer.

Aqueous Solution

In one or more embodiments, a method of forming an electrode for capacitive deionization may include depositing an aqueous solution comprising an ion-exchange polymer, a second crosslinkable hydrophilic polymer, and a crosslinker for the second crosslinkable hydrophilic polymer onto the crosslinked porous layer. After deposition, the aqueous solution may be annealed or dried to create a crosslinked coating layer or to otherwise provide mechanical robustness to the coating layer.

In one or more embodiments, the aqueous solution may include a blend of ion exchange polymer with the second crosslinkable hydrophilic polymer and crosslinker or the second crosslinkable hydrophilic polymer may be chemically functionalized with the ion exchange polymer. In embodiments where the second crosslinkable hydrophilic polymer is chemically functionalized with the ion exchange polymer, the functionalization may take place prior to or after depositing the aqueous solution onto the already deposited crosslinked porous layer.

Porous Material

In one or more embodiments, the porous material is selected from the group consisting of carbonaceous materials, metal organic framework, hexacyanoferrates, carbonized biomaterials, and mixtures thereof. In one or more embodiments, the carbonaceous material may be at least one of activated carbon, activated carbon fibers, aerogels, carbon nanomaterials and their composites, and monolithic carbon materials.

In one or more embodiments, ESM, or carbonized ESM may be effectively used to selectively target anionic species in a solution through electrostatic interactions and/or hydrogen bonding. More specifically, ESM may be particularly effective for adsorbing anions such as $NO_3^-$ relative to other anionic species in complex solutions.

Cross-Linkable Polymer

In one or more embodiments, the first and second cross-linkable hydrophilic polymer may be, independent from each other, selected from the group consisting of polyvinyl alcohol, polyacrylic acid, crown ether, polymethylmethacrylate, glycidylmethacrylate, partially sulfonated polystyrene polymers, polyamide, polyacrylamide, chitosan, or mixtures thereof. The first and second cross-linkable polymers may be homopolymers, random co-polymers, or block co-polymers. In one or more embodiments, the first and second cross-linkable polymers may be, independent from each other, charged or uncharged. In one or more embodiments, when anion selective electrodes are desired the cross-linkable hydrophilic polymer may be quaternized polyvinyl alcohol. In another embodiment, when cation selective electrodes may be desired, polystyrene sulfonate and/or poly(3,4-ethylenedioxythiophene) (PEDOT:PSS) may be employed as a cross-linkable polymer for selectively targeting cations. The cross-linkable hydrophilic polymer may be incorporated into the second layer of the apparatus in accordance with one or more embodiments presented herein. In one or more embodiments the second layer may also include layered double hydroxides.

In yet another embodiment, a crown ether may prepared either alone or in combination with an additional hydrophilic polymer as a cross-linkable polymer for selectively targeting cations such as lithium. A specific examples of a potential lithium ionophore that may be incorporated within a cross-linkable polymer includes, but is not limited to, 2-hydroxymethyl-12-crown-4.

In embodiments where the second cross-linkable hydrophilic polymer is chemically functionalized with the ion exchange polymer, the degree of functionalization may be from 0 to 100% (i.e. from no functionalization to 100% functionalization of the second cross-linkable hydrophilic polymer).

Cross-Linker

In one or more embodiments, the cross-linker for the first and second cross-linkable hydrophilic polymers may be, independent from each other, at least one of sulfosuccinicacid, formaldehyde, glyoxal, adipic aldehyde, a dicarboxylic acid, a tricarboxylic acid, a polycarboxlic acid, anhydrides, acid chlorides, a silane, 3-glycidyloxypropyl) trimethoxysilane (GOPS), polyethylene glycol (PEG) and glutaraldehyde.

In one or more embodiments, the crosslinker for the second cross-linkable hydrophilic polymer can amount from 0 to 100 mol % with respect to the moles of cross-linkable groups on the second cross-linkable polymer. In a more specific embodiment, the crosslinker for the second cross-linkable hydrophilic polymer may be up to 30 mol % with respect to the moles of cross-linkable groups on the second cross-linkable polymer. In one or more embodiments, the ion exchange polymer may be 0 to 20 mol % relative to the second cross-linkable hydrophilic polymer and the crosslinker for the second cross-linkable hydrophilic polymer may also be 0 to 20 mol % relative to the second cross-linkable hydrophilic polymer.

Ion-Exchange Material

In one or more embodiments, the ion-exchange material is an anion exchange polymer or a cation exchange polymer. The ion-exchange material may be dissolved into the aqueous solution prior to deposition or it may be dispersed in particulate form within the aqueous solution prior to deposition. The ion-exchange material may also be pulverized or milled before being mixed with the aqueous solution prior to deposition. In one or more embodiments, the ion-exchange material may include mono-functional or bi-functional ion-exchange groups. For example, the mono-functional ion-exchange groups may include —$SO_3H$, —COOH, —$PO_3H_2$, —$HPO_2H$; —$NH_3$, —$NH_2R$, —$NHR_2$, —$NR_3$. The bi-functional ion-exchange groups may include, for example, aminophosphonic acid groups, iminodiacetate groups, or variations thereof. In one or more embodiments, the ion-exchange material may be the same as the porous material. For example, a layered double hydroxide, metallic organic framework, or hexacyanoferrate may also function as an ion-exchange material.

In one or more embodiments, a particulate ion-exchange material may be processed either mechanically, chemically, or electronically to create nanosized particles or a structure to obtain greater surface area. In one or more embodiments, the processing may be at least one selected from grinding, sonicating, sieving, reduction-oxidation reactions, precipitation reactions, galvanizing, etc. In a more specific embodiment, the ion-exchange particulates may be formed by cryo-grinding the material. In one or more embodiments, the particulate material may be nanoparticles (i.e., particle average diameter between 0.1-200 nm), which may be substantially monodisperse. The average particle diameter may range from any of 0.1, 1, 5, 10, and 20 nm, to a maximum of 50, 100, 150, 200, and 500 nm. The specific ion-exchange material used may be selected to target a specific ion type (e.g., chemistry, charge, etc.).

In one or more embodiments, whether blended with or functionalized onto the second cross-linkable hydrophilic polymer, the ion exchange polymer may be from 10 to 90 wt % or from 30 to 70 wt % of the total weight of the ion exchange polymer plus the second cross-linkable hydrophilic polymer, while the second cross-linkable hydrophilic polymer may be from 90 to 10 wt % or from 70 to 30 wt % of the total weight of the ion exchange polymer plus the second cross-linkable hydrophilic polymer.

Method of Forming an Electrode

In one or more embodiments, a method of forming an electrode for capacitive deionization may include depositing an aqueous slurry onto a substrate, wherein the aqueous slurry comprises a porous material, a first cross-linkable hydrophilic polymer, and a crosslinker for the first cross-linkable hydrophilic polymer. In one or more embodiments, a method of forming an electrode for capacitive deionization may include annealing the aqueous slurry deposited on the substrate to create a crosslinked porous layer on the substrate. One or more embodiments may also separately incorporate an additional ion-exchange membrane between the cross-linked porous layer on the substrate and the feed solution containing the targeted ions.

One or more embodiments herein relate to a fabrication process that is scalable and involves the deposition of multi-layer coatings based on cross-linkable polymers. As disclosed herein, the composition of the electrode and binder can be varied to increase electrode capacity, target specific ions, and improved energy efficiency. Additionally, the fabrication techniques disclosed herein do not require organic solvents in the fabrication of the device.

Deionizing an Aqueous Fluid

In one or more embodiments, a method of deionizing an aqueous fluid may include: continuously flowing the aqueous fluid through a capacitive deionization reactor that includes at least one electrode fabricated as described above, while applying a voltage between an anode and a cathode of the capacitive deionization reactor. In one or more embodiments, the applied voltage may be at most 2 V or at most 1.5 V. In one or more embodiments, the anode and cathode of the deionization reactor may be regenerated by reversing the sign of the applied voltage. For example, if a voltage of 1.5 V is applied to deionize an aqueous fluid then in order to regenerate the electrodes a voltage of −1.5 V may be applied so that the collected ions may be released and the electrodes regenerated. However, the regeneration voltage does not need to be an exact opposite (i.e., 1.5 V/−1.5 V), but may just be opposite in sign than the voltage applied to collect the ions on the electrode(s).

Regeneration of Electrodes

In one or more embodiments the cathode and anode may be regenerated by applying the voltage in the range of zero to the negative of the adsorption voltage value. (i.e. if applied voltage in the adsorption stage is 1.2 V then in the regeneration stage it can be any value between 0 and −1.2 V). For some electrode materials, a negative voltage of lower than 1.2 V can also be utilized to enhance desorption performance.

EXAMPLES

In accordance with one or more embodiments of the invention, the Examples noted below detail the use of electrodes within CDI and MCDI systems wherein the electrodes are fabricated to selectively and preferentially target and remove single or multivalent ions through capacitive deionization.

Examples of Electrode Preparation

Example 1 PVA-GA Electrode

In accordance with one or more embodiments herein, electrodes may be fabricated and coated with ion-exchange polymers wherein the porous electrodes may be fabricated to specifically and selectively remove ionic species from aqueous solutions. In one or embodiments the composition of a porous electrode may consist of 90 wt % high-surface-area powdered activated carbon (PAC) and 10 wt % of the polymeric binder (linear polymer PVA and cross-linker GA) based on the total mass of dry electrodes.

In one embodiment the fabrication of a porous electrode may involve three main steps: slurry preparation, casting, and drying/annealing. In an example, first, a 6 wt % PVA solution was prepared by mixing a desired amount of PVA in DI water at 90° C. for 4 h. Next, a glutaraldehyde (GA) solution (5 mol % relative to PVA repeat units) was added and mixed for 1 hour. PAC was added slowly along with additional DI water, giving the final solid content of the slurry of approximately 30 wt %. The resulting mixture was stirred for 12 h to ensure homogeneity. Next, the homogeneous carbon slurry was deposited directly onto graphite sheets through slurry casting with a gap height of 300 μm. The graphite sheets served as current collectors and were rinsed with DI water first and then adhered to a glass plate using polyimide tape. After slurry deposition, electrodes were dried in air and annealed at 130° C.

Example 2 PVDF Electrode (For Comparison)

PVDF bound electrodes are more commonly used in commercial CDI reactors. For the purpose of comparison, a PVDF was prepared as follows. First, PVDF was dissolved in DMAc (4 wt % solution) for 1 h followed by an addition of activated carbon (90 wt % of the total dry mass). The resulting mixture (approximately 30 wt % solid) was continuously stirred for 12 h. The homogeneous slurry was deposited on a graphite sheet using the slurry casting method with a gap height of 250 μm and dried in the oven at 60° C. for 2 h followed by overnight vacuum drying for complete solvent removal. Prior work has shown that the different mass (or carbon content) and thickness of the electrodes can lead to a different degree of electrode utilizations for similar operating conditions. In this work, the gap height was chosen to produce a similar final electrode mass and thickness comparable to that of PVA-bound electrodes.

Ion Selective Electrode Formation Examples

In accordance with one or more embodiments herein, ion-selective electrodes may include composite electrodes (comprised of porous active material held together by a polymeric binder) that provide selective permeability to multivalent ions. While similar devices have been discussed and reported, the presently described designs are the first practical and effective realization of this type of device. It is been demonstrated herein that specific chemistries may be incorporated to enable selective uptake of multi-valent ions. These chemistries can be tailored to target specific contaminants.

Cation Selective Electrodes

Example C1

A commercial ion-exchange resin (for example, but not limited to, Dow chemical, Amerlite IRC747) was cryo-grinded with liquid nitrogen to achieve the smallest particle. Before coating, particles were sonicated using Ultracell Sonicator VCX-500. To form an ion-exchange polymer (ISP) layer, the particles were mixed with PVA, SSA, and GA and flow coated on the carbon electrode with total weight ratio of 54.2:40.8:4.1:0.9 (particle: PVA:SSA:GA). The mixed slurry may be coated on top of any kind of carbon electrode using the flow coating method. In this Example, the porous electrode of Example 1 was coated as described above before the coated electrode was then cross-linked in a vacuum oven carefully maintained at 80° C. for 12 hours. Cross-linking temperature may be narrowly controlled, as at lower temperatures the PVA/SSA/GA mixture may not sufficiently cross-link which can result in deformation of the PVA layer. On the other hand, at higher temperatures, crosslinked polystyrene resin particles may be damaged. Therefore, it is important to maintain the optimum conditions (formula, coating speed, coating depth, temperature, and reaction time) for fabricating a homogeneous and dense hydrogel ion exchange layer. The surface morphologies of the uncoated carbon and the ISP composite electrodes were examined by scanning electron microscopy (SEM, FEI Quanta 400).

Example C2

Figure 4:
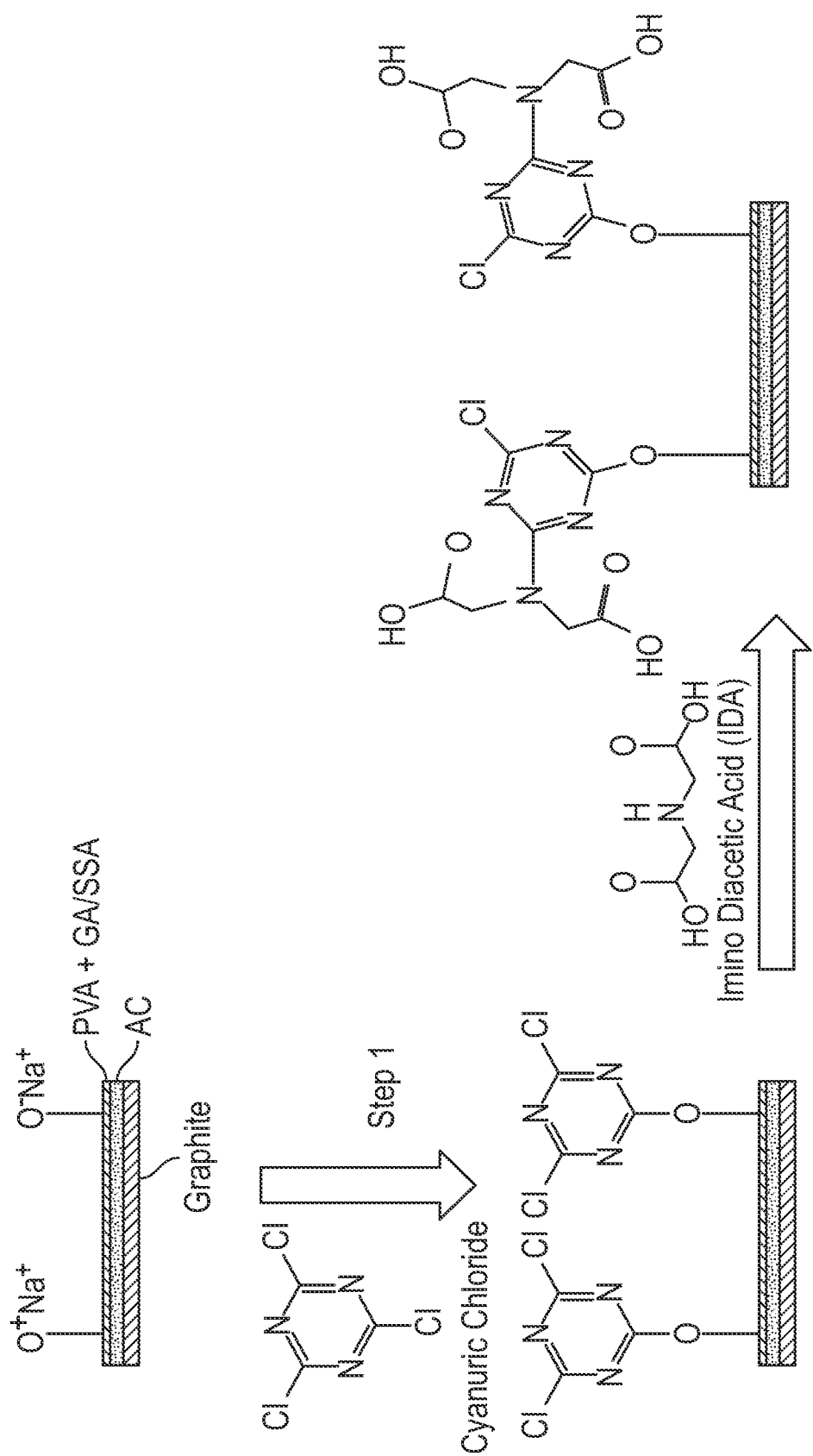
FIG. 4 shows a schematic of the modification procedure for modifying a PVA+SSA/GA coated electrode with IDA.

In this example, prepared in similar fashion to cation exchange layer described in Example C1, the porous cathode of Example 1 was first coated with PVA+SSA/GA aqueous mixture and then modified with iminodiacetic acid (IDA) as shown in FIG. 4.

Example C3

Figure 5:
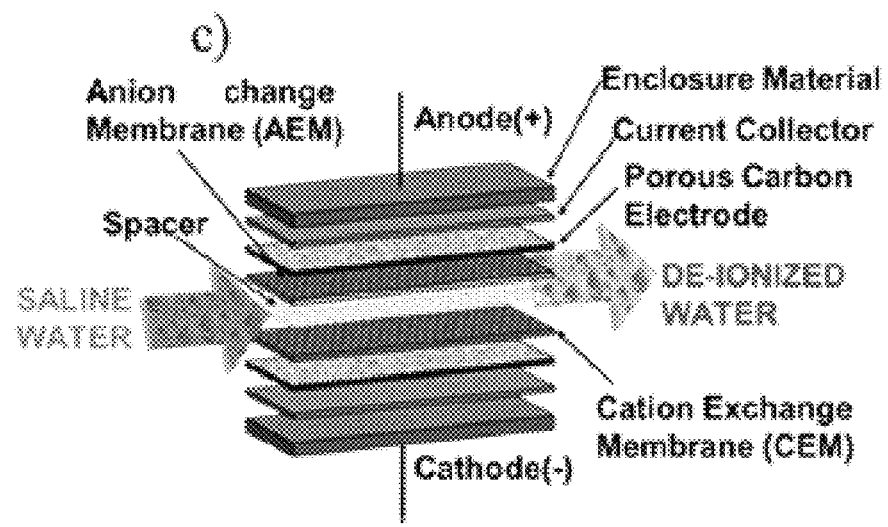
FIG. 5 shows a schematic for MCDI cell assembly.

The cation-exchange polymer coating was comprised of poly(vinyl alcohol) (PVA) and sulfosuccinic acid (SSA) and was synthesized by adapting procedures reported in the literature. A 6 wt % PVA solution was prepared in DI water, and SSA (20 wt % relative to PVA weight) was added followed by mixing for 1 h at room temperature to ensure homogeneity. The resulting mixture was deposited onto the electrode prepared in Example 1 (with PVA binder) and cross-linked by annealing at 130° C. The cation exchange polymer coated electrode was used as the cathode in the MCDI cell system as depicted in FIG. 5.

Example C4

A $Ca^{2+}$ selective nanocomposite (CSN) electrode was prepared by casting a nanocomposite coating containing $Ca^{2+}$ selective ion exchange nanoparticles on the surface of the carbon electrode. A top-down approach was used to first obtain nano-sized $Ca^{2+}$ selective ion exchange resin particles. To obtain nanoparticles without altering their surface chemistry, an Amberlite™ IRC747 resin was cryo-ground using a freezer mill with a milling program consisting 5 cycles of alternating grinding (2 min) and cooling (1 min). The resin nanoparticles were then sonicated in liquid nitrogen for 1 min and then mixed with PVA (6 wt %), GA (25 wt %), and SSA (75 wt %) solutions at a dry weight ratio of 54.2:40.8:4.1:0.9 (resin nanoparticle: PVA:GA:SSA). The slurry was then cast on the preformed carbon electrode, as described in Example 1, using the flow coater at 1 mm/s with a casting slit width of 30 mm. Finally, the coated electrode was dried at room temperature for 12 h and the binder was cross-linked in a vacuum oven at 80° C. for 12 h. All electrodes were precisely cut into 1 cm×10 cm coupons before used in the electro-sorption device.

Example C5

Figure 25:
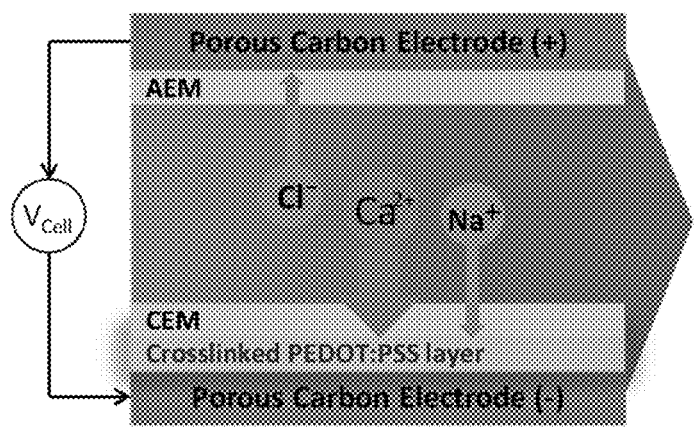
FIG. 25 shows a schematic diagram of an MCDI operation system with an activated carbon electrode on graphite, and a crosslinked PEDOT:PSS coating on the activated carbon electrode.

A $Ca^{2+}$ and $Ba^{2+}$ selective electrode was prepared by coating the surface of the carbon electrode of Example 1 with a mixture of PEDOT:PSS (1.3 wt % in D.I. water) crosslinked with GOPS (0.6 vol % of total PEDOT:PSS solution). An example of such a fabricated electrode is provided in FIG. 25.

Anion Selective Electrodes

Example A1

Figure 6:
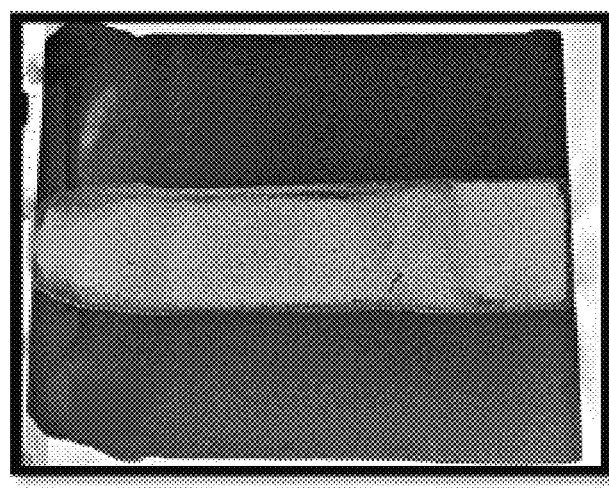
FIG. 6 shows an image of a PVA/GA selective nanosorbent anion exchange resin coated electrode where the resin comprises milled anion exchange nanoparticles.

Similar to the Example C1, a commercial anion exchange resin was crushed into fine powder to produce anion exchange nanoparticles, prior to being mixed with a quarternized polyvinyl alcohol (QPVA)+GA mixture. The resulting mixture was then flow coated onto the anode comprising the porous electrode of Example 1, shown in FIG. 6. A resin coated carbon electrode with a size of 5 cm×10 cm was utilized in a CDI to evaluate the selectivity of sulfate over chloride.

Example A2

Similar to Example A1 the anion-exchange polymer coating was composed of quaternized poly(vinyl alcohol) (QPVA) cross-linked with GA and was synthesized in similar fashion. Specifically, KOH (50 mol % relative to PVA repeat units) and glycidyl trimethylammonium chloride (GTMAC, 50 mol % relative to PVA repeat units) were added to a 6 wt % PVA solution in DI water. Next, the mixture was heated at 70° C. for 4 h while stirring continuously. After cooling to room temperature, the resulting mixture was precipitated in pure ethanol and dried overnight under vacuum to obtain QPVA as a white solid. This product was dissolved in deionized water at 90° C., and the pH was lowered to 5 by adding 1.0 M HCl solution. To this solution, GA cross-linker (10 wt % relative to PVA) was added and stirred for 1 h. The resulting mixture was deposited onto the surface of the electrode as prepared in Example C1 (with PVA binder) and cross-linked at 130° C. for 1 h. The anion-exchange polymer-coated electrode was used as the anode in the MCDI system of FIG. 5.

Example A3

The sulfate selective electrodes were fabricated by casting a layer of QPVA containing pulverized AMBERLITE FPA54 resin onto the carbon electrode, as prepared in Example 1, before the electrode was heated for cross-linking. To prepare the resin slurry, batches of 0.5 g AMBERLITE FPA54 resin were pulverized by cryogenic milling (6750 FREEZER/MILL, SPEX SamplePrep, U.S.A.). The milling program consisted of 15 min cooling in liquid nitrogen, followed by 5 cycles of alternating grinding (2 min) and cooling (1 min), and was repeated once for every batch of resin. The resin powder was then sieved with a 50 μm stainless-steel mesh and mixed with 6 wt % QPVA and GA with a resin-to-QPVA weight ratio of 1:1 and 4.4 mol % glutaraldehyde relative to QPVA repeating units. After homogenization, the resin/QPVA slurry was flow-coated on the air-dried carbon electrode at a loading of 0.03 mL slurry/cm²-electrode unless otherwise specified, and heated overnight in a vacuum oven at 70° C. for cross-linking.

Example A4

Example A4 served as a control electrode for Example A3 and was fabricated using an identical protocol. All electrodes were stored in DI water, and conditioned in the corresponding feed solution (1.0 L) for at least 1 day before each experiment.

Selective Ion Removal Experiments
Study 1 Evaluation of Ion-Exchange Coated Porous Electrodes Desalination tests were conducted using both PVA- and poly PVDF-bound electrodes as prepared with electrodes of Examples 1 and 2, in addition to electrodes coated with ion-exchange coatings, such as Examples C3 and A2 (PC-MCDI), or using bare electrodes (Example 1) along with commercial ion-exchange membranes (MCDI). PVA and PVDF bound electrodes were prepared in accordance with Examples 1 and 2 above, respectively, and are of identical size (10 cm×1 cm) and similar total mass for comparison. Below, the performance of PVA-CDI (Example 1) and PVDF-CDI (Example 2) systems was first compared, followed by an analysis of the PVA-PC-MCDI (Example C3) system with the ion-exchange polymer coatings and PVA-MCDI (Example 1 with commercial ion-exchange membrane) and PVDF-MCDI (Example 2 with commercial ion-exchange membrane) systems that contain commercial ion exchange membranes.

Figure 7:
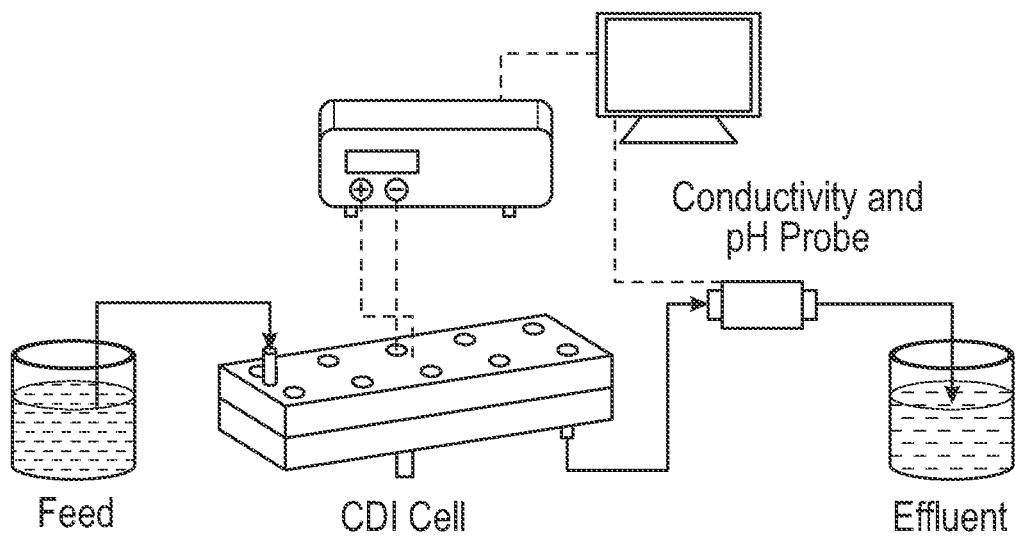
FIG. 7 shows a schematic of a lab scale CDI set up.

Deionization tests were conducted in order to evaluate the selective ion removal performance of the prepared electrodes described in Examples 1, 2, C1, C2, and Example A1. In FIG. 7, a lab scale deionization set up is shown. A pair of ion selective polymer coated electrodes prepared in accordance with the Examples referenced above were inserted into a flow-by CDI cell with a pair of ion exchange membranes and tested with the mixture of the monovalent and divalent ion feed solution. During operation, the CDI effluent was continuously measured in terms of conductivity and ion species. Later, the ions in the product water were precisely analyzed by either ICP-OES or IC. Mixed salt solutions containing two different concentrations (5 mM NaCl and 5 mM $Na_2SO_4$ (1:1), 50 mM NaCl and 5 mM $Na_2SO_4$ (10:1)) were utilized in this study. The flow rate was 0.5 mL/min. The adsorption and desorption voltage were 0.4 V and 0 V respectively. The adsorption/desorption cycle was 30 min.

To evaluate selective removal of multi-valent cation/anions over mono-valent cation/anions, respectively, a selectivity performance index (SPI, Formula (1)) has been developed. The ratio of accumulated amount of adsorbed ions is divided by a constant initial (feed) concentration ratio value. The selectivity performance index gives us a representative number to compare selective ion removal for a wide range of feed concentrations and mono/di-valent ion ratios.

$$SPI = \frac{\sum Conc\_Multi_{abs}}{\sum Conc\_Mono_{abs}} \bigg/ \frac{Conc\_Multi_0}{Conc\_Mono_0} = \frac{\sum Ca_{abs}}{\sum Na_{abs}} \bigg/ \frac{Ca_0}{Na_0}$$

Figure 8:
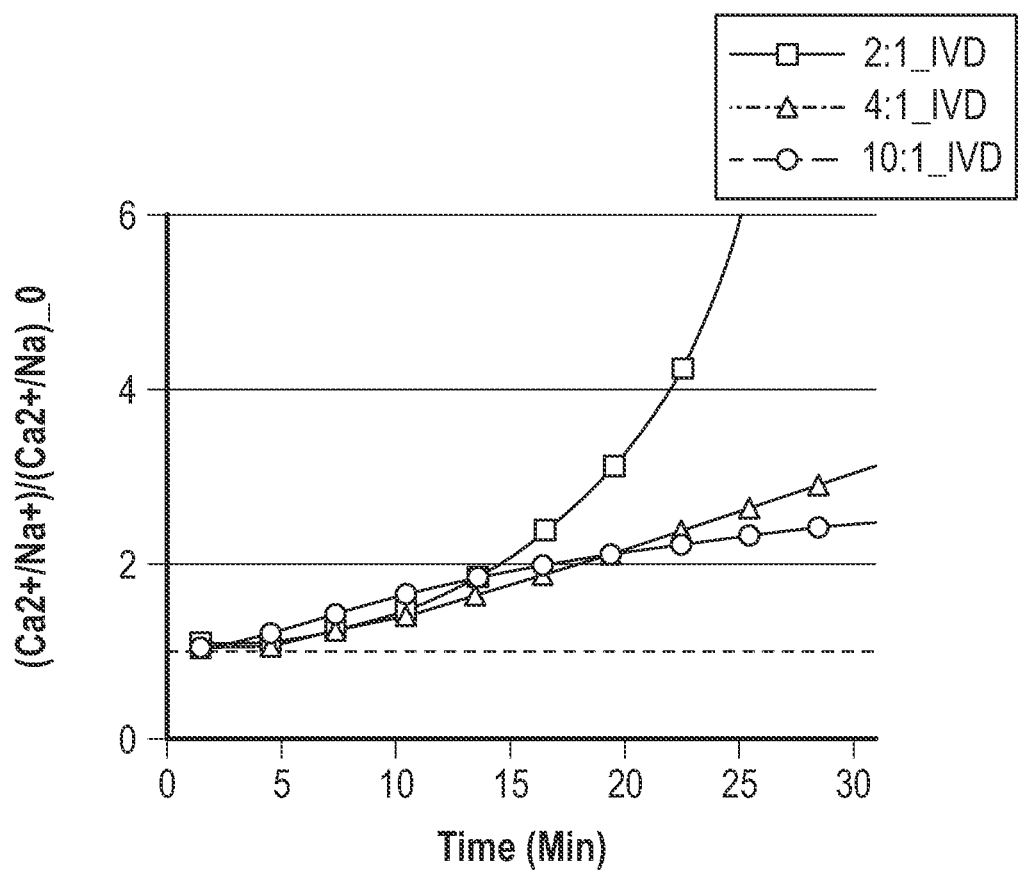
FIG. 8 shows the selective ion removal for the three electrodes compared in Study 1.

For example, the calcium ion selectivity over sodium in this specific Experiment for Example C1 was calculated using the same approach. With different mixing (molar) ratios (Na to Ca, 1:1, 2:1, 4:1, and 10:1, respectively), initial Ca/Na-SPI is equal to one, which means the same amount of both the ions were removed. SPI changes with respect to time and different mixture ratios and is shown in FIG. 8. As shown in FIG. 8, the Ca/Na SPIs at the outset were almost the same and were observed to gradually increase. After a certain period of charging time (after 15 min in this case), the SPI of the lower mixing ratio (2:1) increased much more rapidly than that of the higher mixing ratio. The final SPI at 30 min for 2:1 (11.6) was recorded as the highest Ca-specific selectivity, as shown in Table 1.

TABLE 1

Ion selectivity for different feed concentrations and mixing ratios for a coated electrode of Example C1.

| | ΣCa | ΣNa | Selectivity |
|---|---|---|---|
| 2:1 | 20.2 μM (808 μg) | 3.5 μM (80 μg) | 11.6 |
| 4:1 | 17.4 μM (696 μg) | 24.0 μM (552 μg) | 2.90 |
| 10:1 | 11.8 μM (471 μg) | 48.9 μM (1,124 μg) | 2.41 |

Figure 9:
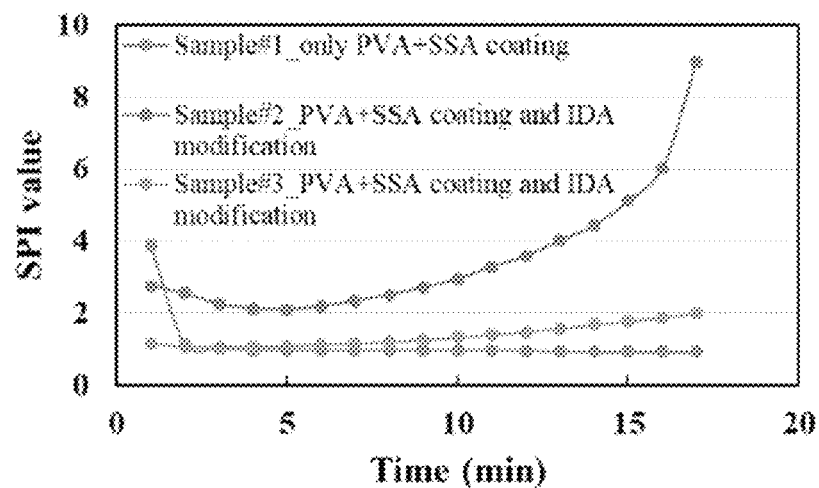
FIG. 9 shows a graph of the selective ion removal for electrodes coated with PVA and SSA both with and without IDA modification.

Similarly, for Example C2, results are shown for the electrodes just coated with PVA+SSA mixture (Example C1) and two other samples of Example C2 (C2A and C2B) modified with IDA as described above. In this approach, all the experiments were conducted using feed solution of 1:1 Ca/Na molar ratio with the total concentration of 10 mm. Electrodes with only PVA+SSA coating provided the selectivity ratio of 0.9, approximately. The electrodes of Example C2 with IDA modification showed significant improvement in selectivity, as demonstrated in FIG. 9. This indicates that a wide range of selectivity values from 1.5 to 4.59 can be obtained in different conditions. With careful optimization of the coating layer and the IDA modification procedure a very high selectivity can be obtained.

Figures 10A, 10B, 10C:
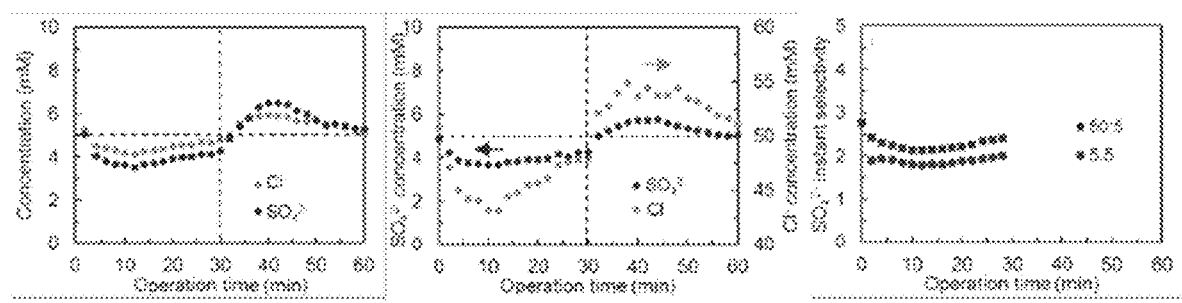
FIGS. 10A-10C show the removal behavior and selectivity of multiple ions by a resin coated CDI reactor.

As shown in FIGS. 10A-10C, for Example A1 the removal efficiency of $SO_4^{2-}$ during adsorption period was much higher than $Cl^-$, indicating that the resin coated CDI has selectivity for $SO_4^{2-}$ over $Cl^-$ at a $Cl^-/SO_4^{2-}$ concentration of 5:5 (FIG. 10A), which was about 2.0 during adsorption period (FIG. 10C). When the $Cl^-$ concentration increased 10 times to a $Cl^-/SO_4^{2-}$ concentration of 50:5 (FIG. 10B), the removal behavior of $SO_4^{2-}$ illustrated little change (despite that the removed $Cl^-$ increased), indicating that the resin coated CDI has great selectivity of $SO_4^{2-}$ over Cl— even at higher $Cl^-/SO_4^{2-}$ ratios (FIG. 10C). The selectivity of $SO_4^{2-}$ over $Cl^-$ at $Cl^-/SO_4^{2-}$ concentration of 50:5 ranged from 2.1 to 2.8 during adsorption period (FIG. 10C).

Study 2-Analysis of Ion-Exchange Coating on Porous Electrode

In this study, a "flow-by type" CDI unit cell was fabricated and assembled into a lab-scale setup, as shown in FIG. 7. The setup included feed solution tank, a peristaltic pump (Cole-Parmer Masterflex, feed pressure <20 kPa), a CDI cell assembly (FIG. 5), an electrochemical analyzer for power supply, and in-line pH and conductivity meters at the exit of the CDI cell and effluent collection tank. The CDI assembly included two electrodes, cation/anion exchange membranes, and graphite current collectors. The two sides of the assembly were separated by a 1-mm-thick woven nonconductive nylon spacer (61% porosity). Additionally, a computer system interfaced with the electrochemical analyzer and the pH and conductivity meters to automatically log the electrical current, pH, and conductivity data, respectively. Current and conductivity values were recorded at 1-s intervals. The pH values were recorded at 10-s intervals and linearly interpolated to estimate the pH for 1-s intervals. Changes in the effluent pH are common for both CDI and MCDI systems and reflect a combination of Faradaic reactions and migration of $H^+$ and $OH^-$ ions to the electrodes. The contributions of $H^+$ and $OH^-$ ions to the measured effluent conductivity were accounted for based on the standard molar conductivities for each ion: 329.82 and 198.6 mS L $mol^{-1}$ $cm^{-1}$ for $H^+$ and $OH^-$, respectively. The molar concentrations of $H^+$ and $OH^-$ were calculated based on the effluent pH, and the conductivity contribution of $H^+$ and $OH^-$ ions was then subtracted from the measured effluent conductivity value to give corrected conductivity values. The corrected conductivity values were then converted to NaCl concentration (mg/L) using feed solution conductivity-concentration relationship (10 mM NaCl, 1.130 mS/cm).

The salt removal performance of the electrodes was evaluated using 10 mM NaCl feed solution and 10 cm×1 cm electrode size (10 $cm^2$ electrode cross-sectional area). Prior to testing, the electrode assembly was equilibrated by running the feed solution continuously for 1 h with no voltage bias. During testing, a constant DC voltage was cycled on (1.2 V) and off (0.0 V) at intervals of 1000 s (16.67 min). The performance of the different types of systems was quantified in terms of the salt adsorption capacity (SAC), average salt adsorption rate (ASAR), salt removal efficiency (SRE), and charge efficiency (CE).

The salt adsorption capacity (SAC, Formula (2)) represents the total salt removed during one adsorption cycle normalized by the total electrode weight. The electrode weight $W_{electrode}$ is the combined weight of both electrodes including the activated carbon and polymeric binder but excluding the ion-exchange polymer layer or ion-exchange membrane:

$$SAC = \frac{Q^* \int (C_o - C_t)dt}{W_{electrode}} \quad \text{Formula (2)}$$

Where Q is the volumetric flow rate of the solution, and $C_o$ and $C_t$ are the feed and effluent NaCl concentrations (mg/L) respectively. The feed concentration $C_o$ is constant during desalination.

The average salt adsorption rate (ASAR, Formula (3)) is calculated by dividing the SAC by the duration of the adsorption cycle ($t_{cycle}$=1000 s):

$$ASAR = \frac{SAC}{t_{cycle}} \quad \text{Formula (3)}$$

The salt removal efficiency (SRE, Formula (4)) represents the fraction of salt removed per adsorption cycle normalized by the inlet salt concentration:

$$SRE = \frac{\left(\int (C_o - C_t)dt\right)}{(C_o^* t_{cycle})} \quad \text{Formula (4)}$$

The charge efficiency (CE, Formula (5)) is the ratio of moles of salt removed relative to the charge supplied during the adsorption step where m is the molecular weight of NaCl (58.44 g/mol) and F is Faraday's constant, 96 485 C/eq.

$$CE = \frac{\left(Q^* \int (C_o - C_t)dt/m\right)}{(\int I^*dt/F)} \quad \text{Formula (5)}$$

Desalination tests were conducted using both PVA and poly PVDF-bound electrodes, Examples 1 and 2, and either using bare electrodes (CDI), electrodes coated with ion-exchange coatings, Examples C3 and A2 (PC-MCDI), or using bare electrodes along with commercial ion-exchange membranes (MCDI). PVA and PVDF bound electrodes were prepared in accordance with Examples 1 and 2 above, respectively, and are of identical size (10 cm×1 cm) and similar total mass for comparison. The coatings and electrodes were stable when immersed in water during desalination tests. Below, the performance of PVA-CDI and PVDF-CDI systems was first compared, followed by an analysis of the PVA-PC-MCDI system with the ion-exchange polymer coatings and PVA-MCDI and PVDF-MCDI systems that contain commercial ion exchange membranes. The performance parameter values reported herein were for the average of 5 cycles of the same sample.

Detailed studies on repeatability were not carried out, but in general, there was a variation of 5% in performance for electrodes fabricated using the same processing conditions and composition. Desalination tests were conducted to understand the effect of binder on the salt removal performance and charge efficiency.

Comparison of Porous Electrode of Example 1 and Example 2

Figure 11A:
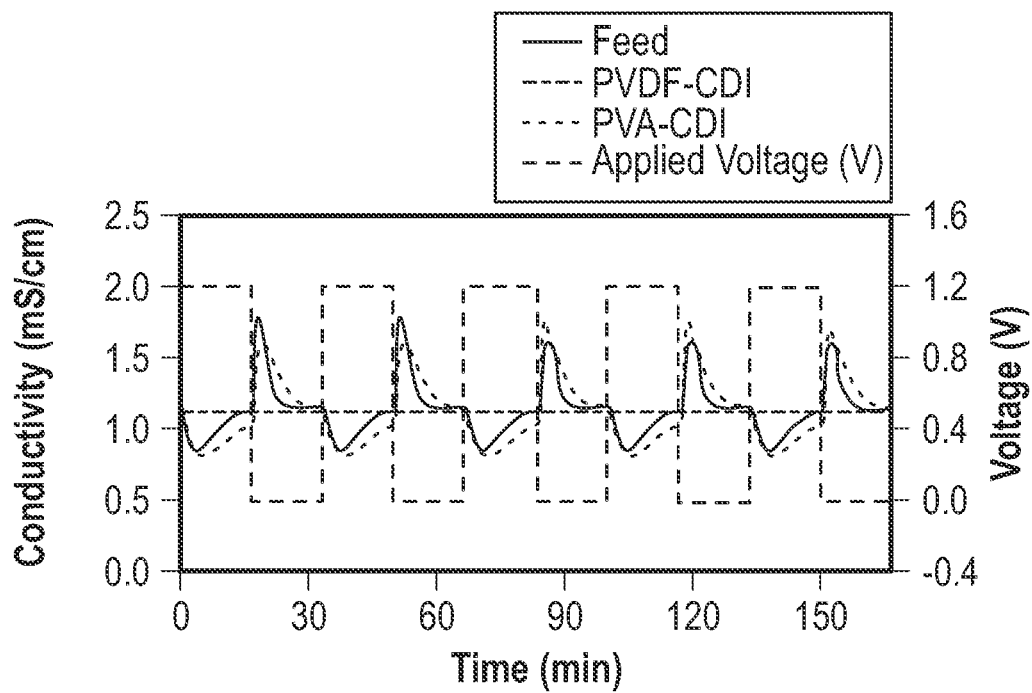
FIGS. 11A-11D show a performance comparison of CDI systems comprising electrodes prepared in accordance with Example 1 (PVA-CDI) and Example 2 (PVDF-CDI).
Figure 11B:
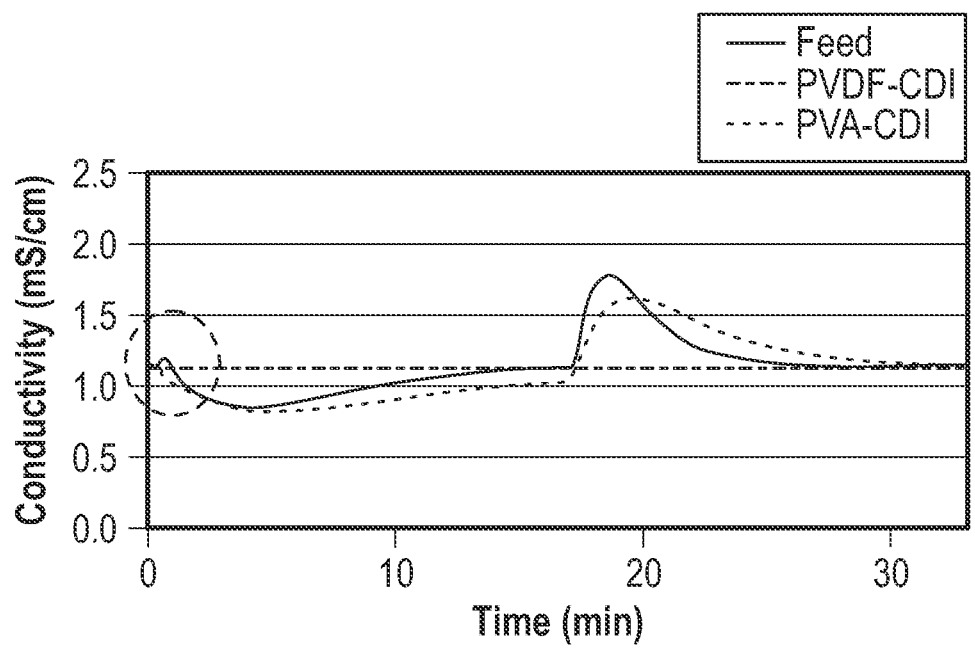

Porous Electrodes of Examples 1 and 2 are compared in FIG. 11A wherein the effluent conductivity for both systems are shown over 5 cycles of operation. During the adsorption cycle on the application of a constant voltage (1.2 V), the effluent conductivity decreases sharply and then increases over time as the electrodes saturate. During the desorption cycle (0.0 V), the effluent conductivity rises sharply and then again decreases as it returns to the feed conductivity. Effluent conductivity for one adsorption/desorption cycle shown in FIG. 11B indicates the presence of the small inverted peak at the beginning of adsorption cycle for the Example 1 system. This has been reported previously and is known as the "inversion effect" and is attributed to co-ion expulsion from the electrodes. This inversion effect leads to reduced salt removal and charge efficiency. It is unclear why an inversion effect is observed for PVDF-bound electrodes of Example 2 only, but this may indicate lower co-ion adsorption for the Example 2 system.

Figure 11C:
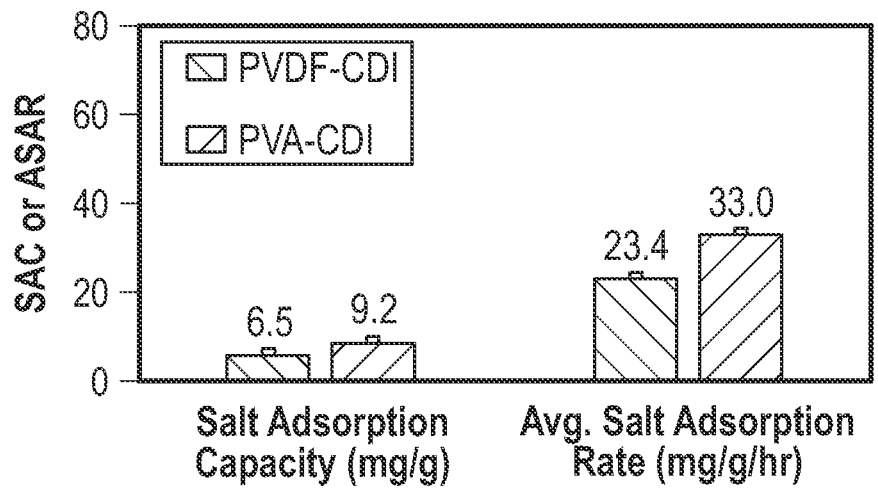
Figure 11D:
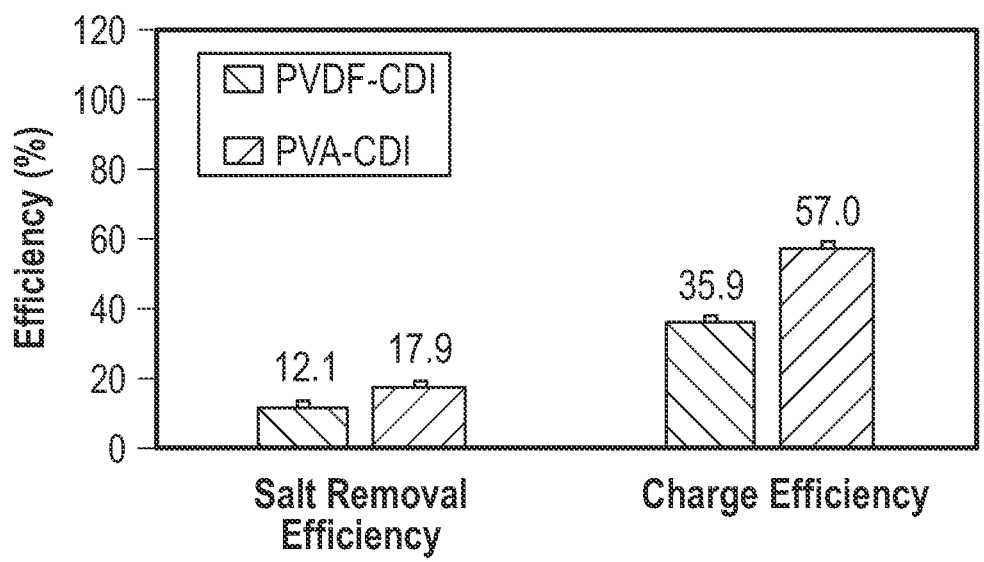

As presented in FIG. 11C, the electrode of Example 1 has a 41% higher salt adsorption capacity (SAC) and average salt adsorption rate (ASAR) relative to PVDF-CDI system. Similarly, the salt removal efficiency (SRE) and charge efficiency (FIG. 11D) is 48% and 59% higher for the system comprising the electrodes of Example 1. This performance difference may be attributed in part, to the minimized inversion effect in the electrode of the system of Example 1 as compared to Example 2 electrode system. Cyclic voltammetry measurements show a much higher specific capacitance for the PVA-bound electrodes compared with PVDF-bound electrodes. Furthermore, as demonstrated through water contact angle analysis PVA bound electrodes are more hydrophilic, which may lead to enhanced ion uptake.

These studies demonstrate that, in addition to the straightforward and scalable fabrication procedures without the use of the organic solvents, the uncoated PVA-CDI system may produce superior results to PVDF electrodes in terms of salt removal performance and charge efficiency.

Comparison of Electrodes in Example 1 and Example C3

Figure 12A:
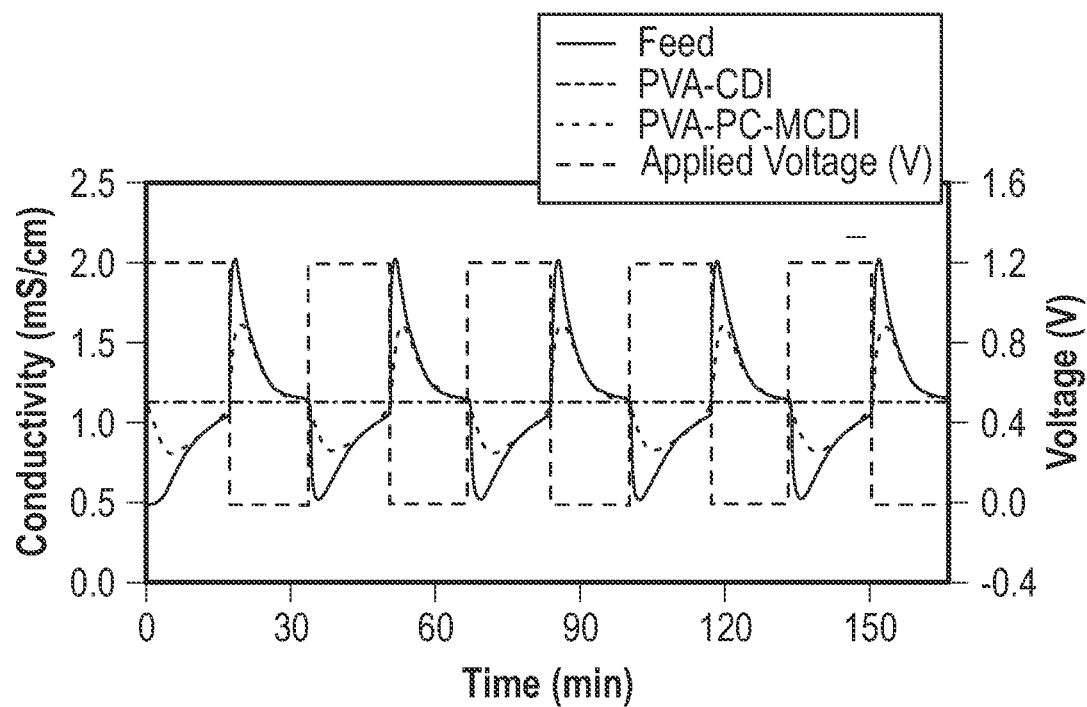
FIGS. 12A-12D show a performance comparison of CDI and MCDI systems comprising electrodes prepared in accordance with Example 1 (PVA-CDI) and Example 3 (PVA-PC-MCDI).
Figure 12B:
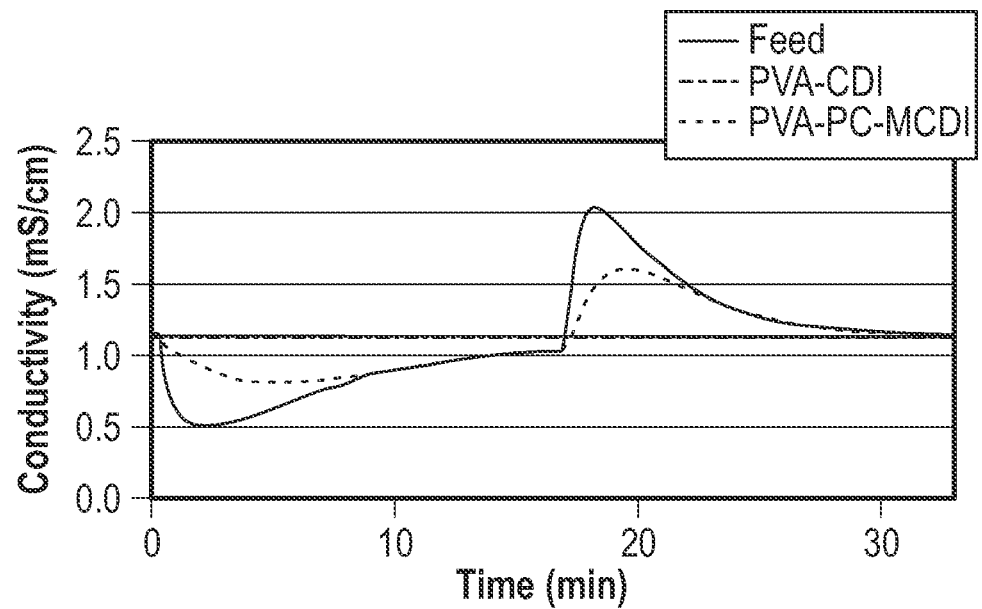
Figure 12C:
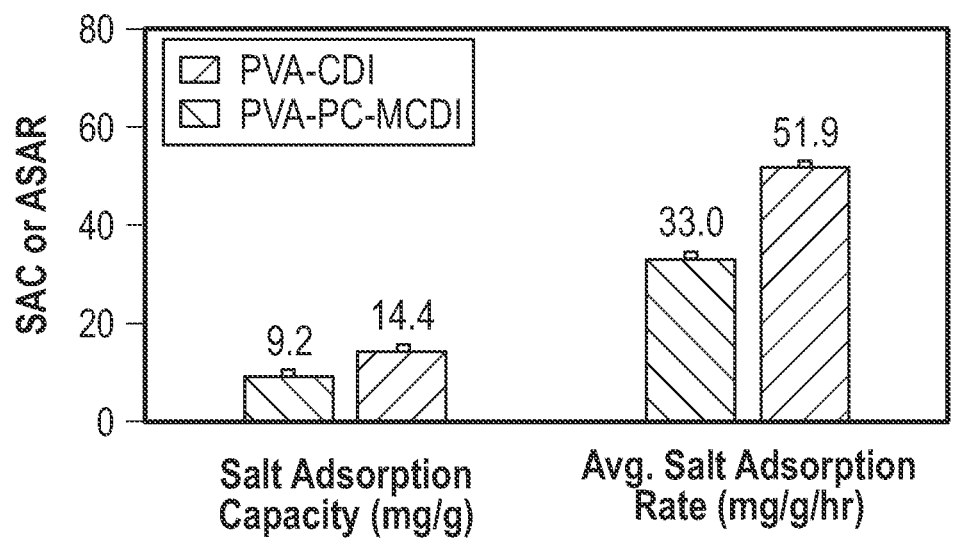
Figure 12D:
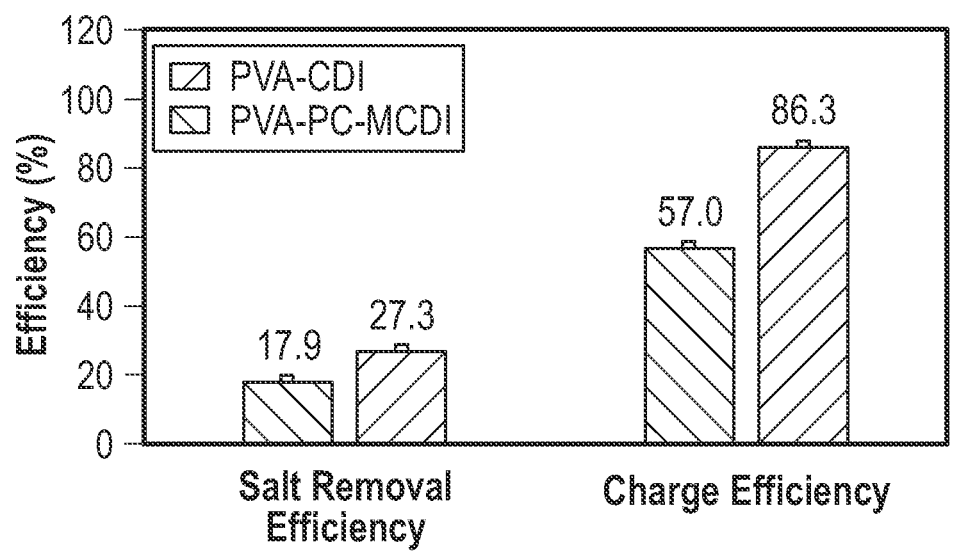

Analysis of the effluent conductivity (FIGS. 12A-12B) revealed a larger salt uptake in the case of Example C3. Averaged over 5 cycles, the amount of salt removed per adsorption cycle was 1.74 mg (29.8 μmol) and 2.66 mg (45.5 μmol) for the Example 1 system and Example C3 system, respectively. Furthermore, the SAC and ASAR (FIG. 12C) were both higher for the Example C3 system by approximately 57%, and the SRE and charge efficiency (FIG. 12D) were improved by 53% and 51%, respectively, for the PVA-PC-MCDI system relative to PVA-CDI system. This performance enhancement may be attributed to the presence of the ion-exchange polymer coatings. The ion-exchange polymer coatings block co-ions from penetrating the electrodes and give increased salt adsorption capacity and charge efficiency. Notably, the salt adsorption capacity of the coated PVA-bound electrodes is higher than typically reported (5-13 mg/g) in the literature for other activated-carbon-based electrodes. This may be attributed to a combination of improved wettability of the electrodes due to hydrophilic polymer binder, the high surface area of activated carbon, and the presence of the ion-exchange polymer coating.

Analysis of the effluent conductivity and effluent pH over a 24-h experiment suggest that the ion-exchange polymer coatings significantly reduce the occurrence of Faradaic reactions, and hence improve stability and long-term performance.

Comparison of Example 1, Example 2, and Example C3 in MCDI Reactors

A variety of ion-exchange membranes are available commercially, and a common approach to fabricate MCDI systems is to place commercial ion-exchange membranes on top of porous electrodes. Commercial ion-exchange membranes are typically as thick as the electrodes (250-300 µm), resulting in significantly increased module size and weight. The thickness of commercial ion-exchange membranes used in this work is 450-µm thick, roughly 45 times the thickness (about 10 µm) of the ion-exchange polymer coating used in these experiments. To evaluate the effectiveness of the ion-exchange polymer coating, a PVA-PC-MCDI (Example C3 within MCDI system) system was compared to a similar PVA-MCDI system with PVA-bound electrodes, in accordance with Example 1, and commercial ion-exchange membranes. In addition, the performance of the PVA-PC-MCDI system was compared to that of PVDF-MCDI (Example 2 within MCDI system), which included commercial ion exchange membranes on top of PVDF-bound electrodes.

Figure 13A:
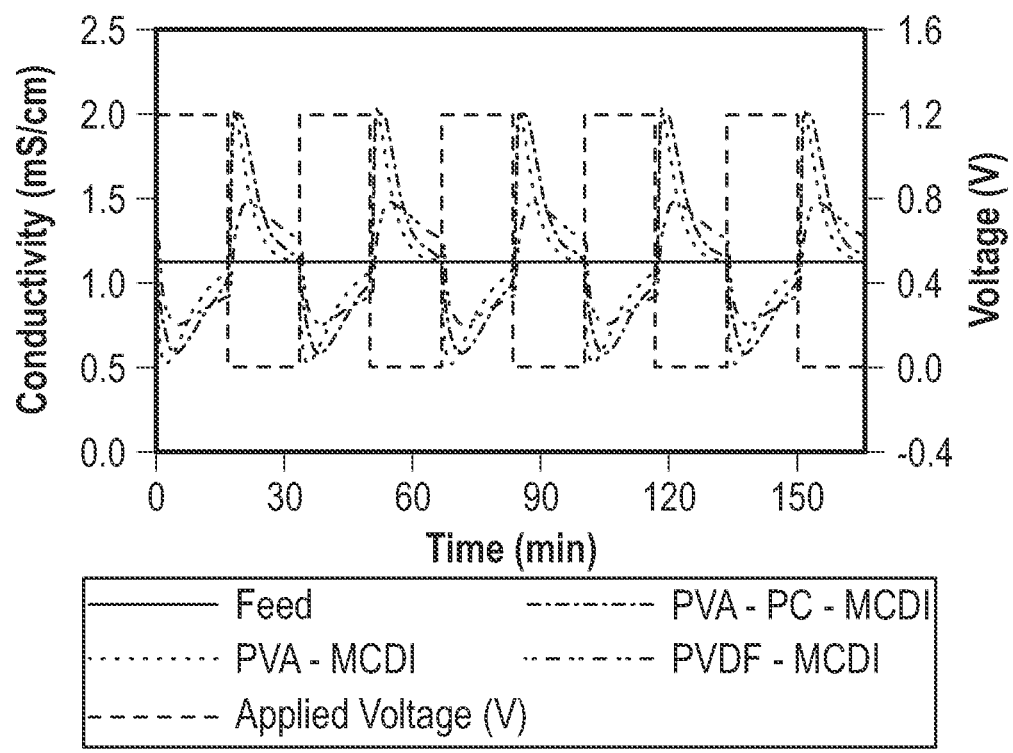
FIGS. 13A-13D show a performance comparison of CDI and MCDI systems comprising electrodes prepared in accordance with Example 1 (PVA-MCDI) and Example 3 (PVA-PC-MCDI) and PVDF-MCDI.
Figure 13B:
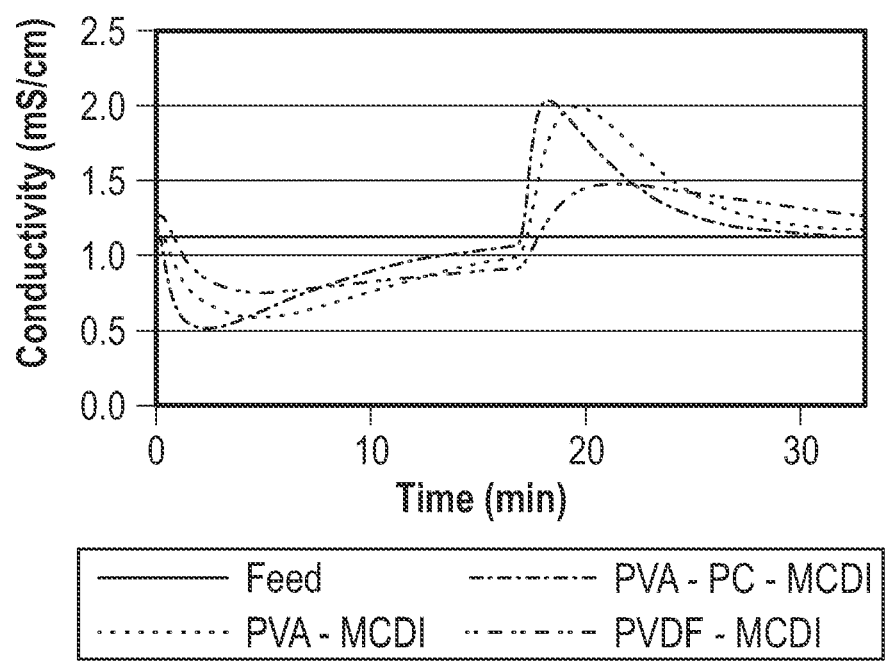

Analysis of the effluent conductivity over 5 cycles of operation, presented in FIG. 13A, indicates reversible electro-sorption for all the three systems. Careful analysis of one adsorption/desorption cycle (FIG. 13B) indicates a higher initial salt uptake rate for the PVA-PC-MCDI system as compared to the other two systems. This suggests that the thin (10 µm) ion-exchange polymer coating layer may have lower area resistance (<2.0 $\Omega cm^2$) and therefore higher initial salt uptake rates compared to the thick (450 µm) commercial ion-exchange membranes (electrical resistance approximately 30 $\Omega cm^2$).

Figure 13C:
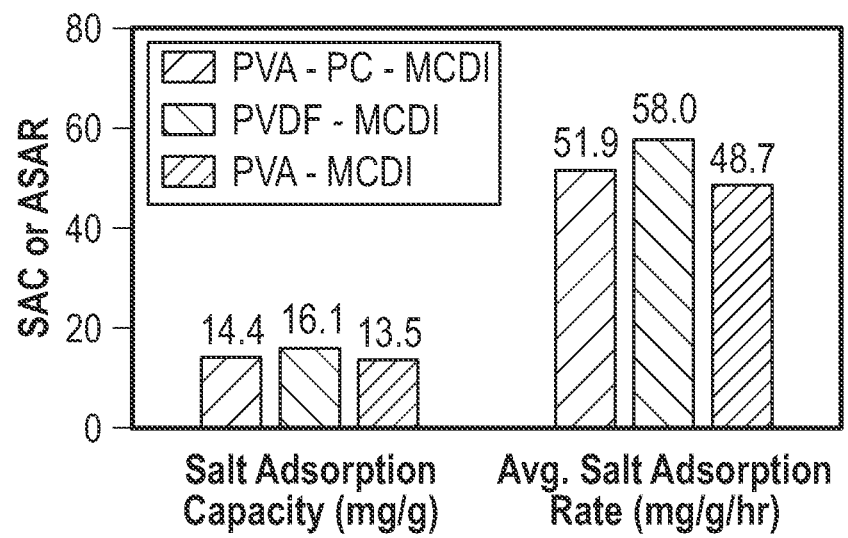
Figure 13D:
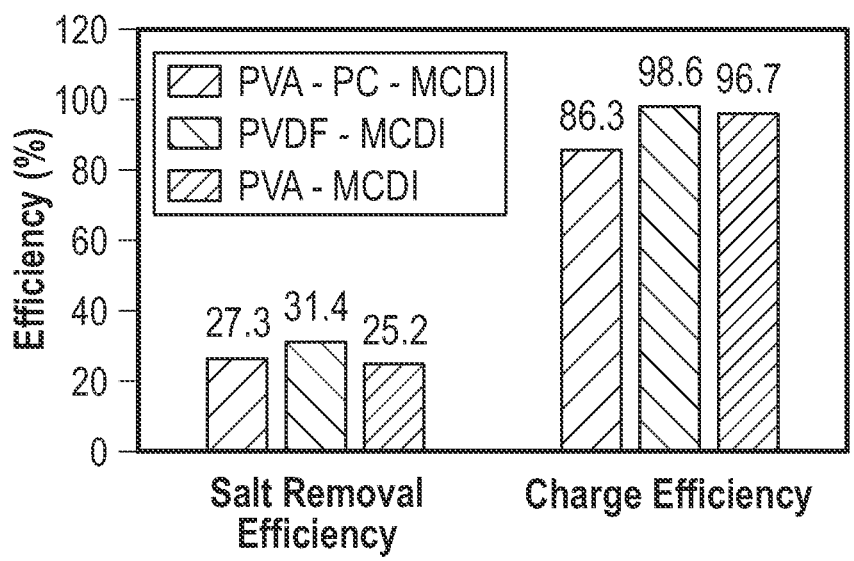

Furthermore, the quantitative comparison of salt removal performance presented in FIG. 13C and FIG. 13D indicates that the PVA-PC-MCDI system has a reduced SAC, ASAR, SRE, and charge efficiency when compared with the PVA-MCDI system. This reduced performance (salt removal and charge efficiency) may be attributed to ion leakage through the thin ion-exchange coatings, resulting in co-ion adsorption in the PVA-PC-MCDI system. To improve the performance of the PVA-PC-MCDI electrodes, optimization of coating layer thickness, composition (charge and cross-linking density), and uniformity may be used.

The effluent conductivity and effluent pH indicate a very stable performance for all three systems. This suggests little or no Faradaic in MCDI systems. In summary, a simple and scalable aqueous based approach was demonstrated for the preparation of electrodes using activated carbon and water-soluble PVA binder without the use of organic solvents. The as-fabricated electrodes were further coated with aqueous solutions of sulfonated (cation exchange) and aminated (anion exchange) polymers to produce the MCDI system. Desalination tests for the polymer-coated electrodes exhibit salt adsorption capacities up to 14.4 mg/g and charge efficiencies up to 86.3%. Furthermore, PVA binder-based electrodes exhibited an adsorption capacity and charge efficiency of 16.1 mg/g and 97.1%, respectively, when paired with commercial ion-exchange membranes. PVA bound electrodes exhibited salt uptake capacities exceeding 18.0 mg/g when paired with low-resistance commercial ion-exchange membranes. Notably, the obtained salt adsorption capacities and charge efficiencies are higher than typically achieved for activated carbon electrodes with a hydrophobic polymer binder.

Study 3 Selective Sulfate Removal Study

Figure 14:
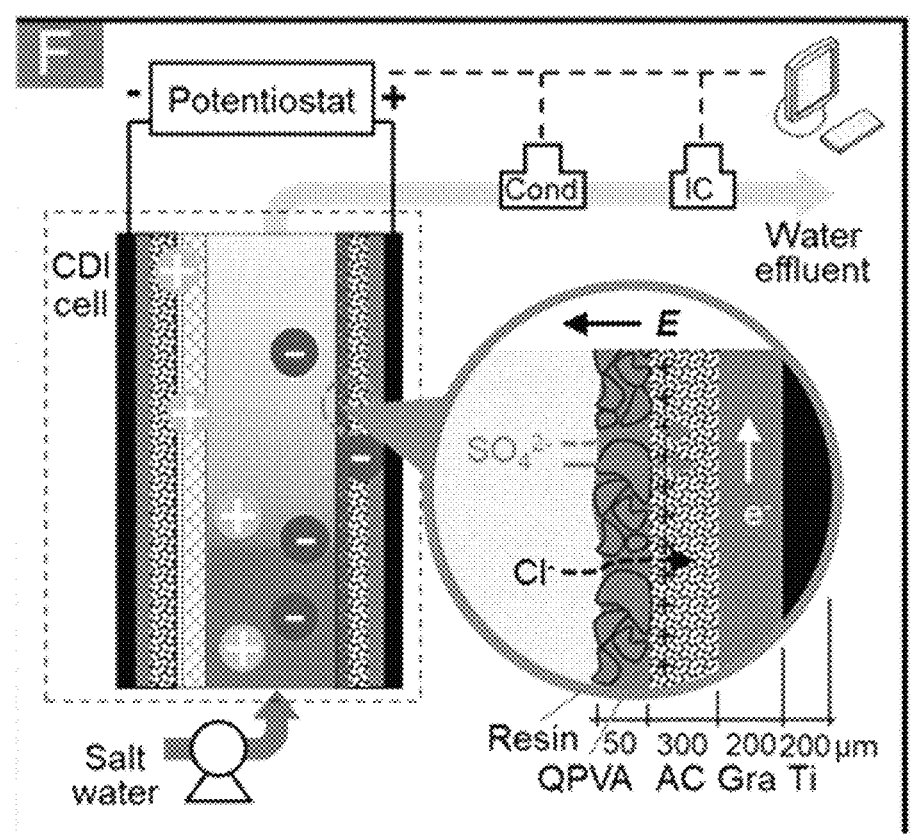
FIG. 14 shows a schematic diagram of a CDI operation system with an activated carbon electrode on graphite, and a selective nano-sorbent resin/QPVA coating on the activated carbon electrode.

CDI experiments were performed using the uncoated, QPVA coated (Example A4), or resin/QPVA coated (Example A3) electrodes as the anode, and an uncoated carbon electrode with a CEM as the cathode. All experiments were performed in the flow-by (i.e., single pass) mode for at least 12 h (FIG. 14). During operation, binary solutions containing different concentrations of NaCl and $Na_2SO_4$ were continuously pumped into the CDI reactor at 1.0 mL/min for all experiments. The adsorption and desorption cycles were set at 1.5 h unless otherwise specified. The applied voltage was 1.2 V during adsorption and 0 V during desorption. A multistep potential method was utilized to provide constant voltage using a potentiostat, and the current was recorded by the potentiostat at 1 s intervals. Effluent conductivity was recorded at 1 s intervals using a micro conductivity meter. Both the potentiostat and the micro conductivity meter were interfaced with a computer for continuous automatic recording of data (FIG. 14). Effluent samples were also collected at 2 min intervals for analysis of $SO_4^{2-}$ and $Cl^-$ concentrations by ion chromatography. An uncoated electrode (5×1 cm2) was used as the counter electrode.

The carbon electrodes in each sample of this experiment were prepared in similar fashion to Example 1.

Figure 15F:
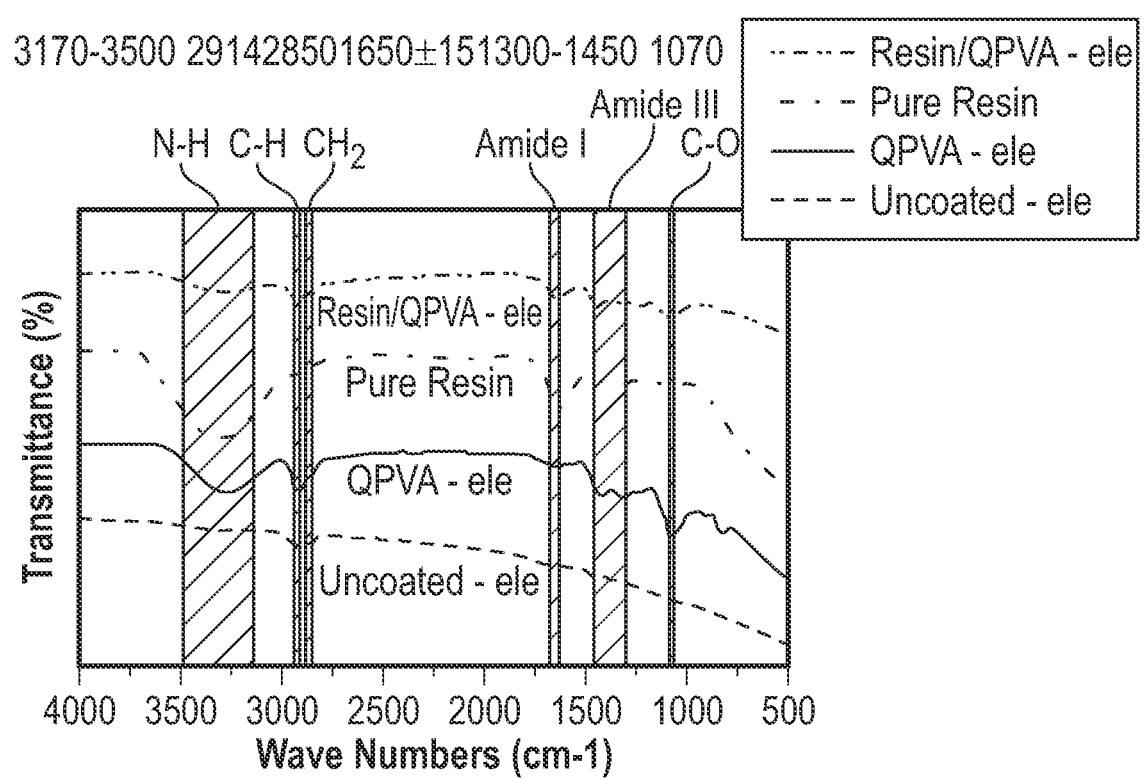

FIGS. 15A-15C show SEM images of the surface and cross-section of the pristine activated carbon electrodes. The PAC particle size ranged between 1 and 10 µm, and the electrodes were approximately 300 µm thick. Casting 0.03 $mL/cm^2$ resin slurry on the carbon electrode resulted in a ~23 µm thick composite film on the carbon electrode surface (FIGS. 15D-15E). The resin powders blended uniformly with the QPVA binder. In contrast, the QPVA coated electrode has a dense and homogeneous polymeric coating, with a thickness of ~10 µm.

FTIR analysis (FIG. 15F) of the carbon electrode showed two small peaks at 2914 and 2850 $cm^{-1}$, corresponding to C—H and CH2 stretches, respectively. This confirms the presence of the PVA binder in the carbon electrode. The QPVA coated carbon electrode of Example A4 showed strong C—H, C—O, N—H and amide III stretches, consistent with its molecule structure. The spectrum of the resin powder contained amide I and N—H stretches but relatively lower C—H stretches compared with QPVA. The spectrum of the resin/QPVA electrode of Example A3 exhibited features of both the resin powder and QPVA with stretches corresponding to nitrogen functional groups that can provide affinity for divalent anions (such as sulfate) over monovalent ions. EIS showed that the uncoated electrode had an Ohmic and diffusion resistance of 16.2 and 29.7$\Omega$, respectively, much lower than that of QPVA coated electrode (31.0 and 41.9$\Omega$, respectively) and resin/QPVA coated electrode (22.0 and 35.0$\Omega$, respectively).

In the CDI experiments, all electrodes produced highly reproducible current and effluent conductivity in a large number of adsorption and desorption cycles. The very high consistency between the adsorption and the desorption currents suggests that ion adsorption was completely reversible. The adsorption and desorption currents of the uncoated electrode (Example 1) was higher than those of the QPVA (Example A4) and resin/QPVA coated electrodes (Example A3), which was attribute to its lower resistance.

Desalination performance was assessed by total salt removal (SR, mequiv/m2 (Formula 6), or mg/g equivalent to NaCl adsorption (Formula 7)) and specific ion removal (IR, mmol/m2) during an adsorption cycle per unit electrode surface area (m2) (Formula 8). Charge efficiency (CE) represents the ratio of ions removed to the number of charges supplied during the adsorption cycle as defined in Formula 9.

$$SR = \frac{Q \int_0^t (C_{Cl^-,inf} - C_{Cl^-,eff} + 2(C_{SO_4^{2-},inf} - C_{SO_4^{2-},inf}))dt}{A_e}$$

Formula 6

$$SR = \frac{QM \int_0^t (C_{Cl^-,inf} - C_{Cl^-,eff} + 2(C_{SO_4^{2-},inf} - C_{SO_4^{2-},inf}))dt}{m_e}$$

Formula 7

$$IR = \frac{Q \int_0^t (C_{i,inf} - C_{i,eff})dt}{A_e}$$

Formula 8

$$CE = \frac{F \cdot Q \int_0^t (C_{Cl^-,inf} - C_{Cl^-,eff} + 2(C_{SO_4^{2-},inf} - C_{SO_4^{2-},inf}))dt}{\int_0^t I dt}$$

Formula 9

Here, Q (L/s) is flow rate, $C_{Cl^-,inf}$, $C_{SO_4^{2-},inf}$, $C_{Cl^-,eff}$ and $C_{SO_4^{2-},eff}$ (mmol/L) are $Cl^-$ and $SO_4^{2-}$ concentrations in the influent (inf) and effluent (eff), respectively; t (s) is duration of the adsorption cycle; i is a specific ion, $Cl^-$ or $SO_4^{2-}$; $A_e$ (m²) is the effective frontal area of anodes; M is the mole weight of NaCl (58.5 g/mol); $m_e$ is the total mass of the two electrodes (include the PVA material but not include the graphite sheet); F is Faraday's constant (96,485 C/mol); and I is the current (A).

Selectivity ($S_{i/j}$) between two competing ions i and j is defined by Formula 10, where the numerator and denominator represent the ratio between the solid phase concentration (or amount adsorbed) and the influent concentration (i.e., equilibrium aqueous phase concentration at adsorption saturation) of ions i and j, resnectively.

$$S_{i/j} = \frac{\int_0^t Q(C_{i,inf} - C_{i,eff})dt / C_{i,inf}}{\int_0^t Q(C_{j,inf} - C_{j,eff})dt / C_{j,inf}}$$

Formula 10

Desalination Performance and $SO_4^{2-}$ Selectivity

Experiments were first conducted using a bisolute solution containing 5 mmol/L NaCl and 5 mmol/L Na₂SO₄. As shown in FIG. 16A, the uncoated electrode of Example 1 achieved an adsorption capacity of 13.6±0.4 and 13.8±0.6 mmol/m² for $SO_4^{2-}$ and $Cl^-$, respectively, with a total salt removal of 41.0±0.9 mequiv/m² (11.5 mg/g) and charge efficiency of 46.2%±1.0% (FIG. 16E). When coated with QPVA in Example A4, the $SO_4^{2-}$ and $Cl^-$ removal increased to 17.4±0.8 and 19.6±1.0 mmol/m² respectively. The adsorption capacity and charge efficiency increased significantly to 54.4±2.6 mequiv/m² (15.3 mg/g) and 86.1%±4.1% (FIG. 16E) respectively. The large increase in charge efficiency confirms that the quaternary amine functional groups on the QPVA provide anion exchange capacity and exclude cations. The total anion adsorption capacity did not increase proportionally with the charge efficiency. This may be attributed to the increase in electrode resistance when it is coated with QPVA. The QPVA coating also resulted in significantly more $Cl^-$ adsorption than $SO_4^{2-}$. This may be attributed to the higher relative diffusivity of $Cl^-$ versus $SO_4^{2-}$ compared to that in the bulk solution, which has been observed in electrodialysis systems. Further discussion is provided in the next section.

The resin/QPVA coated electrode of Example A3 exhibited a salt adsorption capacity of 58.4±1.4 mequiv/m² (16.4 mg/g, $SO_4^{2-}$ and $Cl^-$ removal of 23.9±0.6 and 10.6±0.9 mmol/m² respectively), 42% and 7% higher than that of the uncoated Example 1 electrode and the QPVA coated electrode of Example A4. Compared to both the uncoated and QPVA coated electrodes, the resin/QPVA coated electrode in Example A3 had much higher $SO_4^{2-}$ adsorption (76% and 37% increase, respectively), and notably lower adsorption for $Cl^-$ (23% and 46% decrease, respectively) (FIG. 16A). Example A3 exhibited significant selectivity for $SO_4^{2-}$ over $Cl^-$.

As shown in FIG. 16D, the $SO_4^{2-}$ to $Cl^-$ selectivity as defined in Formula 5 increased from 1.37 at the beginning of the adsorption cycle to 2.24 when adsorption reached equilibrium, while the uncoated and QPVA coated electrodes of Examples 1 and A4 had $SO_4^{2-}$ to $Cl^-$ selectivity lower than 1. During desorption, the released amounts of $SO_4^{2-}$ (23.7±0.4 mmol/m² 99.2% recovery) and $Cl^-$ (10.4±0.4 mmol/m² 98.1% recovery) (FIG. 16C) were consistent with the adsorption selectivity observed, indicating that the selective adsorption process was completely reversible. Interestingly, the charge efficiency of the resin/QPVA coated electrode in Example A3 was 66.5%±1.6%, which was lower than that of the QPVA coated electrode, although still 44% higher than that of the uncoated electrode. It is speculated that the reduced charge efficiency compared to that of the QPVA coated electrode may be caused by imperfection at the interface of the resin particle and the QPVA matrix (FIG. 15E), which allows more co-ions (i.e., cations) to transport through. On the basis of the salt removal and current generation data, the energy consumption for $SO_4^{2-}$ removal was 431.1 kJ/mol-of-$SO_4^{2-}$ removed for the resin/QPVA coated electrode, significantly lower than the uncoated electrode (755.5 kJ/mol-of-$SO_4^{2-}$ removed).

Influence of Resin Coating Thickness

Figure 18A:
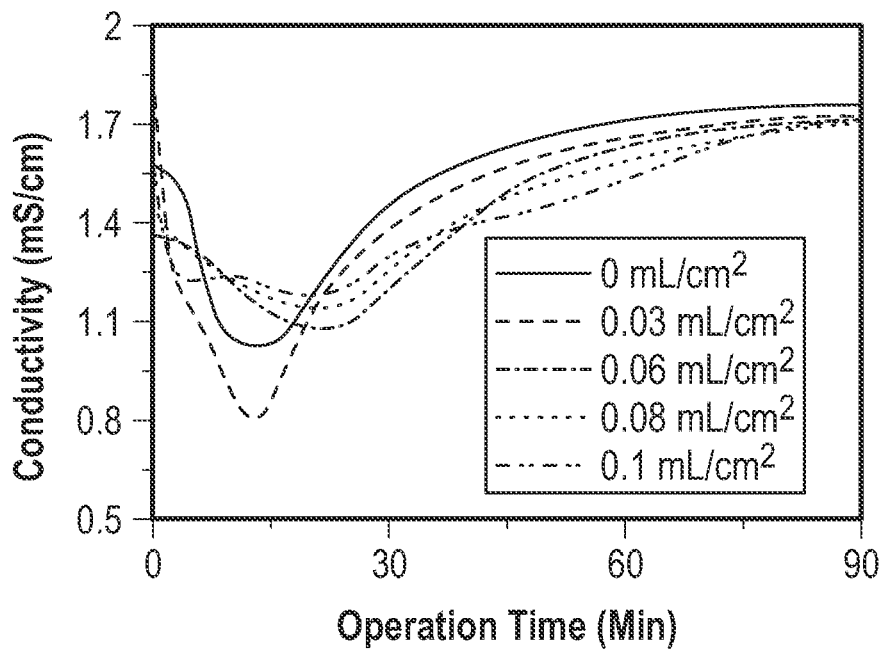
FIGS. 18A-18C show the influence of coating thickness (coating amount) on CDI performance.
Figure 18B:
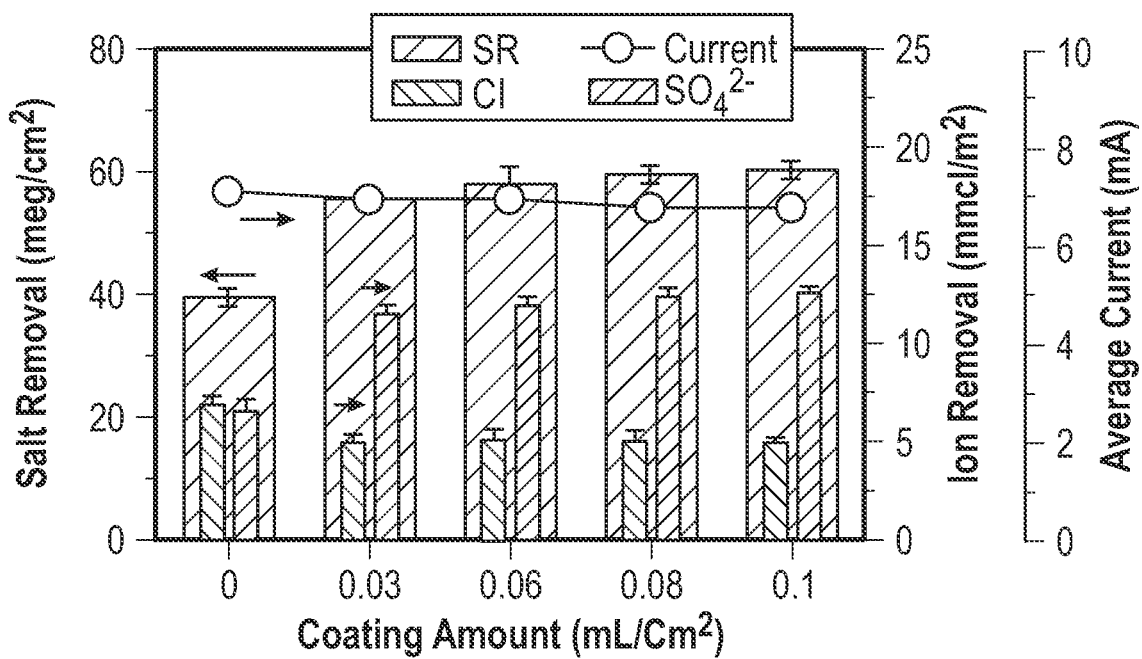
Figure 18C:
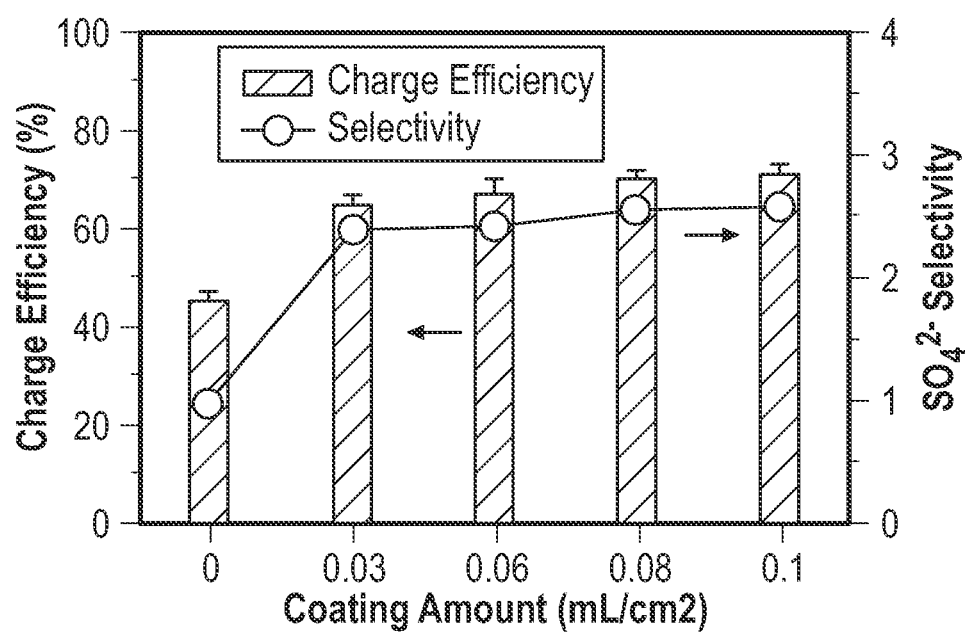

Although it renders selectivity, a coating on the electrode surface may also increase ion transport resistance and hence hinder removal kinetics. To evaluate the influence of coating thickness on adsorption kinetics, the amount of resin slurry deposited was increased from 0.03 mL/cm² to 0.06, 0.08, and 0.1 mL/cm² resulting in resin/QPVA coating thicknesses of 23.1±2.1, 42.4±1.9, 48.3±4.7, and 65.7±3.0 μm for samples prepared as described in Example A3, respectively (FIGS. 17A-17E). A thin coating (slurry loading at 0.03 mL/cm2) resulted in notably greater salt removal (FIG. 18A and FIG. 18B). This may be attributed to the exclusion of co-ions by the coating, which increased charge efficiency from 44.7% (uncoated) to 70.8% (0.1 mL/cm2 loading of the resin/QPVA slurry, FIG. 18C).

Further increase in coating thickness led to slight increase in salt adsorption capacity despite the slight decrease in the average electric current during the adsorption cycle. These results suggest that the additional electric resistance from the coating did not have a significant impact on the salt removal. The very small changes in adsorption capacity with thicker coatings also suggest that the resin/QPVA coating does not contribute to the adsorption of the anions. But more notably, it primarily affects the ion transport.

The thinnest coating increased the $SO_4^{2-}$ to $Cl^-$ selectivity from 0.96 (uncoated electrode) to 2.33, and the selectivity increased slightly with increasing coating thickness, reaching 2.57 with 0.1 mL/cm2 loading of the resin/QPVA slurry. However, thicker coatings did hinder adsorption and desorption kinetics as shown in FIG. 18A, underlining the role of optimizing the coating thickness and composition to improve performance.

Long Term Stability of Resin/QPVA Electrode

The resin/QPVA-coated electrode was continuously operated for 50 cycles with adsorption/desorption period of 30 min to evaluate its long-term stability. As shown in FIG. 19A, the current production and effluent conductivity exhibited excellent repeatability during the 50 h operation. Analysis of specific ion concentrations during the 2nd and 50th cycle showed almost identical evolution of ion concentrations in the effluent (FIG. 19B).

Through the Examples provided above it was demonstrated that selective removal of $SO_4^{2-}$ in the presence of a wide range of $Cl^-$ concentrations may be achieved using a carbon electrode coated with a thin film containing QPVA and $SO_4^{2-}$ selective resin. The resin/QPVA coating not only functions as an anion exchange membrane to mitigate adsorption of co-ions, but may allow preferential transport of $SO_4^{2-}$, resulting in significantly improved charge efficiency as well as strong selectivity for $SO_4^{2-}$ over a wide range of $Cl^-$: $SO_4^{2-}$ concentration ratios. The transport rate of anions through the resin/QPVA coating seems to be qualitatively consistent with the "solution-diffusion" model, where the solubility or partition coefficient and diffusivity of the ion determine its transport rate. Interestingly, the $SO_4^{2-}$ selectivity only decreased slightly when the influent $Cl^-$: $SO_4^{2-}$ concentration ratio increased from 1:1 to 20:1, much less than what the solution diffusion model would predict. These results suggest that the interactions between the anions and the composite resin QPVA coating are complex and heterogeneous due to the presence of microscale domain of high $SO_4^{2-}$ affinity (i.e., the resin particles), and the nonselective matrix (i.e., QPVA).

Compared to the QPVA coating, the resin/QPVA coating slightly reduced charge efficiency, and the charge efficiency is significantly lower than that of commercial anion exchange membranes. However, this may be proved by further reducing the size of the cryo-ground anion exchange nano-sorbent resin.

Study 4 Selective Calcium Removal Study

In this study, a simple yet highly effective method to achieve calcium-selective removal in an electrosorption process by coating the cathode with a calcium selective nanocomposite (CSN) layer using an aqueous phase process is demonstrated. The carbon electrodes were prepared in accordance with Example 1. The calcium selective nanocomposite electrode was prepared as described in Example C4.

The ion removal performance of the electrodes was evaluated in flow-by the MCDI system illustrated in FIG. 20. A bare carbon electrode was used as the anode in all experiments, and the performance of the CSN electrode was compared with that of an uncoated carbon electrode, as prepared in Example 1 (the control) as the cathode. The effective area of both electrodes was 10 cm². Although the CSN coating also serves as a cation exchange membrane (CEM), a CEM was still used in all experiments to ensure consistent charge efficiency so that the $Ca^{2+}$ selective function of the CSN coating can be separated from its cation exchange function. A polypropylene mesh spacer with a 500 mm mesh opening and 61% porosity was installed between two ion exchange membranes to create a flow channel of ~1 mm in depth.

Characterization of Electrodes

Figure 21A:
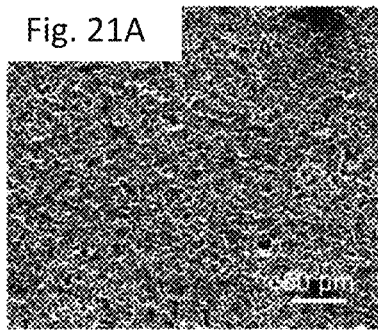
FIGS. 21A-21F show SEM images wherein the top (FIG. 21A) and cross-sectional view (FIG. 21B) are of uncoated electrode, and top (FIG. 21C) and cross-sectional view (FIG. 21D, 21F) of the CSN electrode; arrows in FIG. 21F indicating resin nanoparticles.
Figure 21B:
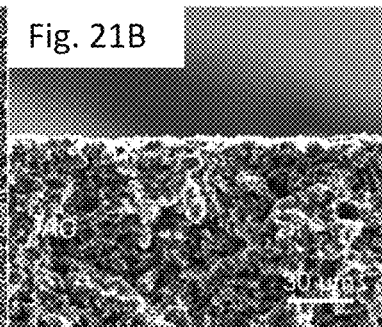

After cryo-grinding and sonication in liquid nitrogen, the pulverized resin nanoparticles had an average particle diameter of 143±44 nm, 3 orders of magnitude smaller than its original size. SEM images showed that the prepared uncoated electrodes had a flat surface with a thickness of ~300 mm, and the activated carbon had a particle size of ~5 mm (FIGS. 21A-21B).

Figure 21E:
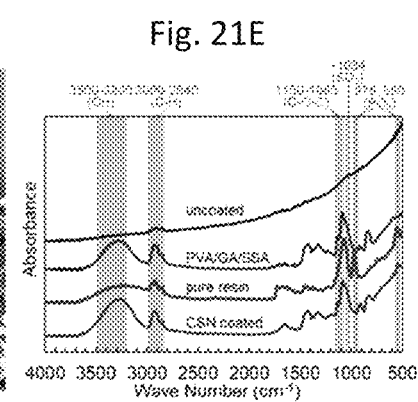
Figure 21C:
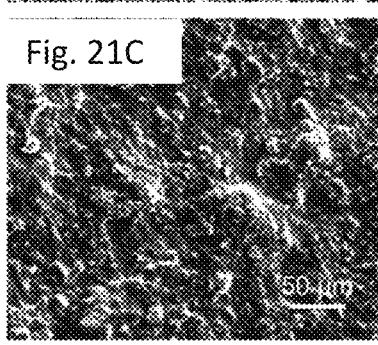
Figure 21D:
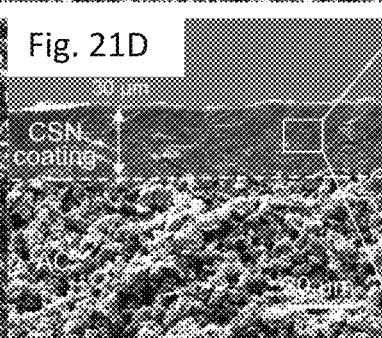
Figure 21F:
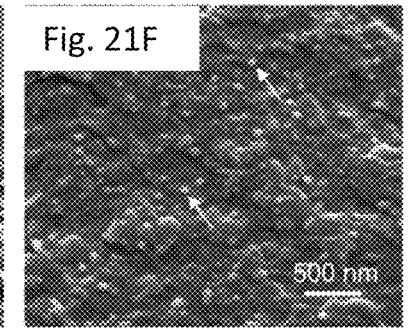

Modification of the electrode with the CSN resulted in a dense, continuous coating of ~30 mm in thickness (FIGS. 21C-21D) with resin nanoparticles well dispersed and distributed uniformly in the polymer matrix. FIG. 21E compares FTIR spectra of the different electrodes as well as the unprocessed resin. The spectrum of the resin contained peaks of phosphonic ($—PO_3$) functional groups at 975 and 550 cm$^{-1}$, which offers high affinity to $Ca^{2+}$ over $Na^+$. The CSN electrode clearly exhibited features of both the resin and the PVA/GA/SSA polymer matrix.

Evaluation of Electrode Performance

Similar to studies 1-3, performance parameters were employed to evaluate the overall capability of the prepared electrodes. In this study, such parameters included salt adsorption capacity (SAC, Formula 11), charge efficiency (Λ, Formula 12), and the amount of salt adsorbed at the end of the adsorption stage ($q_T$, Formula 13), wherein SAC measures the equilibrium adsorption capacity of the electrode, while Λ represents the percentage of the applied electric charges utilized for ion adsorption in the adsorption cycle.

$$SAC = q_T / S_{elec} \qquad \text{Formula 11}$$

$$\Lambda = F q_T \Big/ \int_0^{t_{ad}} I(t)dt \qquad \text{Formula 12}$$

$$q_T = \int_0^{t_{ad}} Q \sum (C_{i,inf} - C_{i,eff}) dt \qquad \text{Formula 13}$$

$$S_{t/c} = \frac{q_{T,t}}{q_{T,c}} \Big/ \frac{C_{in,t}}{C_{in,c}} \qquad \text{Formula 14}$$

In the above Formulas, $S_{elec}$ is the top surface area of two electrodes (m²); F is the Faraday constant (96,485 C/eq); $t_a d$ is the duration of the adsorption stage in each adsorption/desorption cycle (1.5 h); 1(t) is electric current (A) at time t; Q is influent flow rate (L/s); and $C_{i,inf}$ and $C_{i,eff}$ are influent and effluent concentration (meq/L) of ion i. All reported values were average from at least three consecutive cycles.

It is noted that the salt adsorption capacity is based on the top surface area of the carbon electrode. Additionally, for the binary electrolyte solutions, a selectivity coefficient $S_{t/c}$ defined in accordance with the definition of ion exchanges processes (Formula 14) was employed to measure selectivity for the target (t) ion ($Ca^{2+}$) over the competing ion (c) ($Na^+$).

Figure 22A:
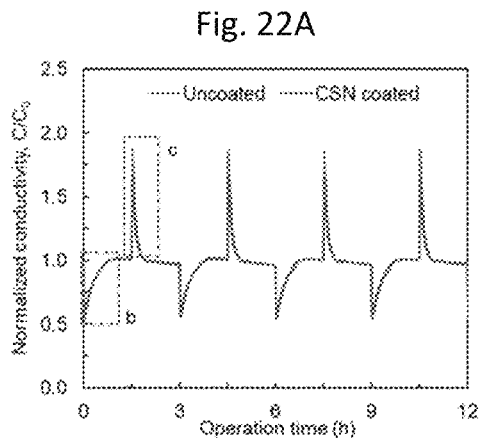
FIGS. 22A-22D show (FIG. 22A) conductivity profiles of the two electrodes.
Figure 22B:
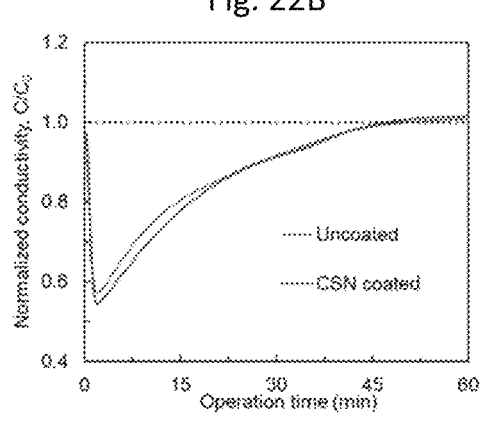
Figure 22C:
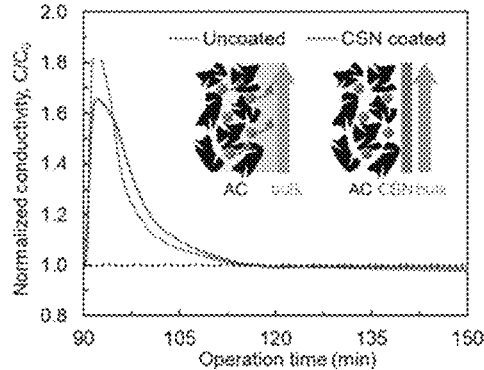

In the single solute experiments the control (Example 1) and CSN electrodes (Example C5) were first evaluated separately in single solute experiments using feed solutions containing 10 meq/L NaCl or $CaCl_2$. A close examination of the conductivity profile revealed almost identical adsorption kinetics of the two electrodes for both NaCl and $CaCl_2$ (FIG. 22B). As demonstrated in FIG. 22A, highly reproducible current and conductivity profiles were observed in all cycles with both electrodes. During the desorption stage using reverse voltage, the control electrode exhibited a higher and sharper desorption peak than the CSN electrode (FIG. 22C). This suggests that the CSN coating slightly hindered ion transport back to the bulk solution, presumably due to the additional mass transfer resistance imposed by the CSN coating.

Figure 22D:
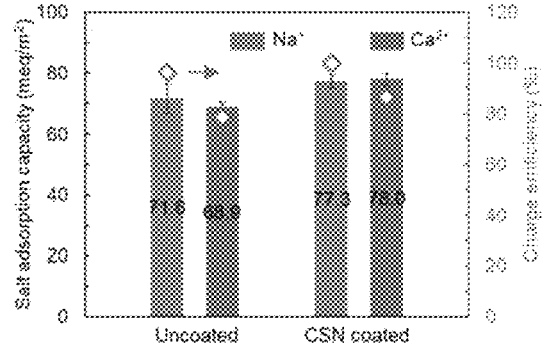

Despite the different valence and size of $Ca^{2+}$ and $Na^{2+}$, their adsorption capacity by the uncoated electrode in terms of milliequivalent was similar 68.9 and 71.6 meq/m² for $Ca^{2+}$ and $Na^+$, respectively in comparable initial concentrations (10 meq/L). As a comparison, the SAC of the CSN electrode was 77.3 and 78.0 meq/m² for $Na^+$ and $Ca^{2+}$ respectively, 8% and 13% higher than the uncoated carbon electrode. The higher SAC may be attributed to increased charge efficiency (ratio of salt adsorption over charge in a CDI cycle), which was 78.7% ($CaCl_2$) and 86.9% (NaCl) for the uncoated electrode, and 86.4% ($CaC_2$) and 92.9% (NaCl) for the CSN electrode (FIG. 22D). This demonstrated improved performance of the modified CSN electrode of Example C5 relative to the control electrode of Example 1

In the binary solution experiments, solutions of NaCl and $CaCl_2$ with a total concentration of 10 meq/L and different $Na^+$-to-$Ca^{2+}$ were used as the feed water to investigate $Ca^{2+}$ adsorption in the presence of Nat The results are summarized in FIGS. 23A-C and 24.

The adsorption and desorption kinetic data (FIGS. 23A and 23B) revealed a substantial difference between the performance of the uncoated and CSN electrodes. The uncoated electrode exhibited notably faster $Na^+$ adsorption than $Ca^{2+}$ adsorption despite the higher electrophoretic mobility of $Ca^{2+}$. This behavior may be attributed to the smaller radius of hydrated $Na^+$ (3.58 Å versus 4.12 Å for $Ca^{2+}$) and hence faster diffusion into the carbon pores, the rate limiting step of the electro-sorption process. About twice as much equivalents of $Ca^{2+}$ (46.1±5.1 meq/m2) were adsorbed as $Na^+$ (24.7±2.5 meq/m2), resulting in a St/c of 1.9±0.1.

Unlike in the single salt $CaCl_2$ solution, the CSN coating greatly enhanced $Ca^{2+}$ adsorption kinetics in the presence of $Na^+$ (FIG. 23A). It also increased the total SAC from 70.8±7.6 to 82.4±2.0 meq/m², a 16.4% increase, and although the SAC measured in mmol/m² remained unchanged (47.7±5.0 and 47.7±1.5 mmol/m2 for uncoated and CSN electrode, respectively, FIG. 23C). The improved equivalent salt adsorption by the CSN coating may be attributed to enhanced adsorption of $Ca^{2+}$ relative to $Na^+$. As shown in FIG. 23C, $Ca^{2+}$ adsorption (69.5±0.9 meq/m²) by the CSN electrode was 50.7% higher than that of the uncoated electrode (46.1±5.1 meq/m²), while $Na^+$ adsorption decreased by 48% (from 24.7±2.5 to 12.9±1.1 meq/m²), resulting in a greatly improved $Ca^{2+}$ selectivity ($S_{t/c}$) of 5.4.

CSN Selectivity Mechanism

As discussed above, the CSN coating increased $Ca^{2+}$ adsorption relative to $Na^+$ on the carbon electrode, while having little direct contribution to $Ca^{2+}$ adsorption capacity. In the previous Study 3, it was shown that selective $SO_4^{2-}$ removal in the presence of $Cl^-$ was achieved using a $SO_4^{2-}$ selective coating on a carbon electrode which was due to preferential transport of $SO_4^{2-}$ through the coating.

It is assumed that the same mechanism is responsible for the selective $Ca^{2+}$ removal observed in the current study. To test this hypothesis, experiments were carried out in an electrodialysis cell to characterize ion transport through the CSN coating using a binary solution containing 5 meq/L of NaCl and 10 meq/L $CaCl_2$. By applying a constant current, the concentration of both $Ca^{2+}$ and $Na^+$ decreased with operation time in the cation donor chamber, while a corresponding increase was observed in the ion acceptor chamber (FIG. 24).

Detailed mass balance analysis found that the decreased concentration of ions in the donor chamber was comparable with the accumulated ions in the accepting chamber with negligible ion adsorption on the CSN coated MF membrane, suggesting electro-migration of cations through the CSN MF under the electric field. The results further showed a 2.7 times higher $Ca^{2+}$ migration flux (155.0 meq/m2-min) was achieved through the CSN coating than $Na^+$ (57.1 meq/m2-min) for a 2:1 ($Ca^{2+}$:$Na^+$) initial concentration ratio, despite the fact that $Ca^{2+}$ had a larger hydrated ion size (4.12 Å for $Ca^{2+}$ vs 3.58 Å for $Na^+$). The electro-migration flux of $Ca^{2+}$ is ~2.7 times that of $Na^+$, which is comparable with the $S_{t/c}$ ratio between the CSN and uncoated electrodes (5.4/1.9) obtained in the electrosorption experiment at an influent $Na^+$-to-$Ca^{2+}$ equivalent ratio of 1:1.

These results suggest that the higher affinity of the CSN electrode of Example C4 for $Ca^{2+}$ resulted in the faster electro-migration rate of $Ca^{2+}$ through the CSN coating, which is consistent with the solution diffusion model. The higher flux of $Ca^{2+}$ relative to $Na^+$ would lead to a higher $Ca^{2+}$-to-$Na^+$ concentration ratio that the carbon electrode is exposed to, and therefore increased $Ca^{2+}$ adsorption by the carbon electrode surface.

The CSN electrode was also shown to be reversible in long term operation, further demonstrating its long term performance.

In this study, a nanocomposite electrode (Example C4) was developed that selectively removes $Ca^{2+}$ in the presence of competing $Na^+$ ions by applying a $Ca^{2+}$-selective nanocomposite (CSN) coating on the activated carbon electrode. The high affinity of the nanosized $Ca^{2+}$ selective resin particles for $Ca^{2+}$ ions results in higher $Ca^{2+}$ permselectivity than $Na^+$, and hence an elevated $Ca^{2+}$-concentration in the carbon electrode pores, which leads to increased $Ca^{2+}$ adsorption relative to the competing $Na^+$ The CSN electrode exhibited excellent performance over the long-term operation, with highly stable salt adsorption capacity, $Ca^{2+}$ selectivity and regenerability.

Study 5 PEDOT:PSS Selective Coating

Desalination tests were conducted using porous electrodes only modified with a commercial CEM layer and porous electrodes prepared in accordance with Example C5 wherein the bound electrodes as prepared with electrodes of Examples 1 with ion-exchange coatings prepared from PEDOT:PSS solutions. Below, the performance of PEDOT:PSS MCDI (Example 5) and CEM only systems was first compared, at varying applied voltages wherein the selectivity of the MCDI system for ions such as $Na^+$, $Ca^{2+}$, and $Ba^{2+}$.

Deionization tests were conducted in order to evaluate the selective ion removal performance of the prepared electrodes described above. A pair of ion selective polymer coated electrodes prepared in accordance with the Examples referenced above were inserted into a flow-by MCDI cell with a pair of ion exchange membranes and tested with the mixture of the monovalent and divalent ion feed solution. During operation, the CDI effluent was continuously measured in terms of conductivity and ion species. Mixed salt solutions containing two different concentrations (5 mM NaCl and 5 mM $CaCl_2$ (1:1)) were utilized in this study. The flow rate was 1 mL/min. The constant voltage was varied over the course of 7 different feed solutions experiments (#'s 1-7 in Table 2 below) and included 1.2 V and 6 V respectively. The adsorption/desorption cycle was 16.3 min.

The selectivity for specific ion adsorption was analyzed and calculated as described below in formulas 15-17.

$$\text{Fractional 'Na' removed} = \frac{Na_{feed} - Na_{eff}}{Na_{feed}} \quad \text{Formula 15}$$

$$\text{Fractional 'Ca' removed} = \frac{Ca_{feed} - Ca_{eff}}{Ca_{feed}} \quad \text{Formula 16}$$

$$\text{Selectivity (Ratio of fractional removal)}, S_{Na}^{Ca} = \frac{Ca_{fr}}{Na_{fr}} \quad \text{Formula 17}$$

The results of this study are summarized in Table 2 below.

TABLE 2

| # | Feed solution | Voltage | Cation exchange layer | Na | Ca | Ba | Selectivity |
|---|---|---|---|---|---|---|---|
| 1 | 10 mM, Na/Ca, 1:1 | 1.2 | CEM only | 0.27 | 0.34 | NA | 1.24 |
| 2 | 10 mM, Na/Ca, 1:1 | 1.2 | CEM plus PEDOT PSS | 0.28 | 0.39 | NA | 1.36 |
| 3 | 10 mM, Na/Ca, 1:1 | 0.6 | CEM only | 0.09 | 0.17 | NA | 2.01 |
| 4 | 10 mM, Na/Ca, 1:1 | 0.6 | CEM plus PEDOT PSS | 0.02 | 0.17 | NA | 6.98 |
| 5 | 10 mM, Na/Ba, 1:1 | 1.2 | CEM plus PEDOT PSS | 0.18 | NA | 0.39 | 2.21 |
| 6 | 10 mM, Na/Ba, 2:1 | 0.6 | CEM plus PEDOT PSS | 0.03 | NA | 0.19 | 6.23 |
| 7 | 13.3 mM, Na/Ca/Ba, 2:1:1 | 0.6 | CEM plus PEDOT PSS | 0.04 | 0.10 | 0.12 | 5.03 |

Figure 26A:
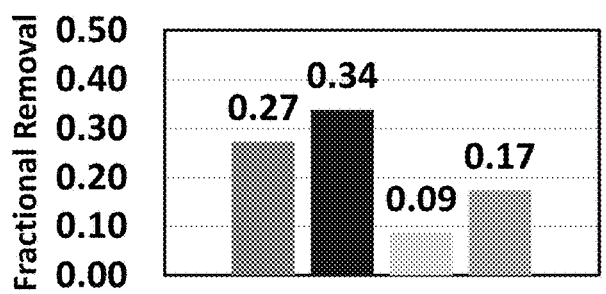
FIGS. 26A-26B show a comparative graph of the fractional removal ratio of $Na^+$ and $Ca^{2+}$ for electrodes comprising only a CEM (FIG. 26A) and for electrodes comprising a CEM in addition to a PEDOT:PSS crosslinked layer (FIG. 26B).
Figure 26B:
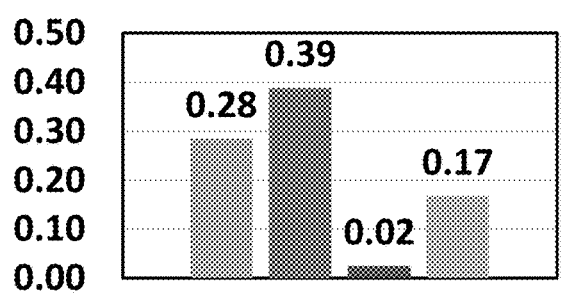
Figure 27A:
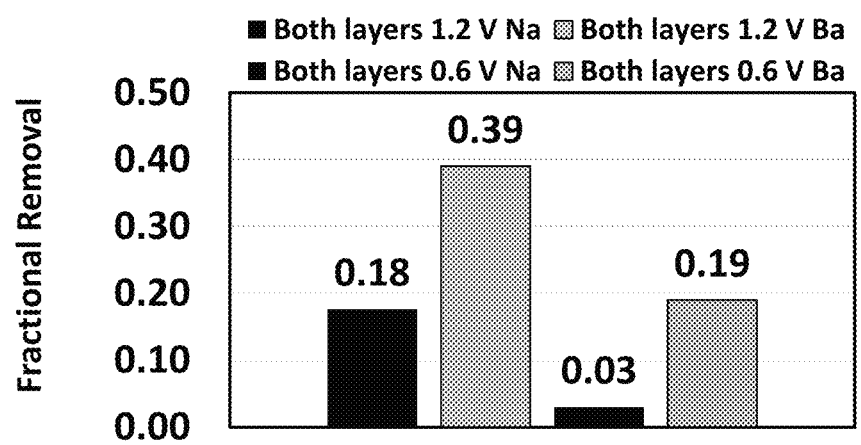
FIGS. 27A-27B show a comparative graph of the fractional removal ratio of $Ba^{2+}$ and $Ca^{2+}$ for electrodes comprising both layers CEM (FIG. 27A) at different applied voltages and FIG. 27B shows the fractional removal ratio of each ion from a mixed solution comprising all three ($Na^+$, $Ca^{2+}$, $Ba^{2+}$).
Figure 27B:
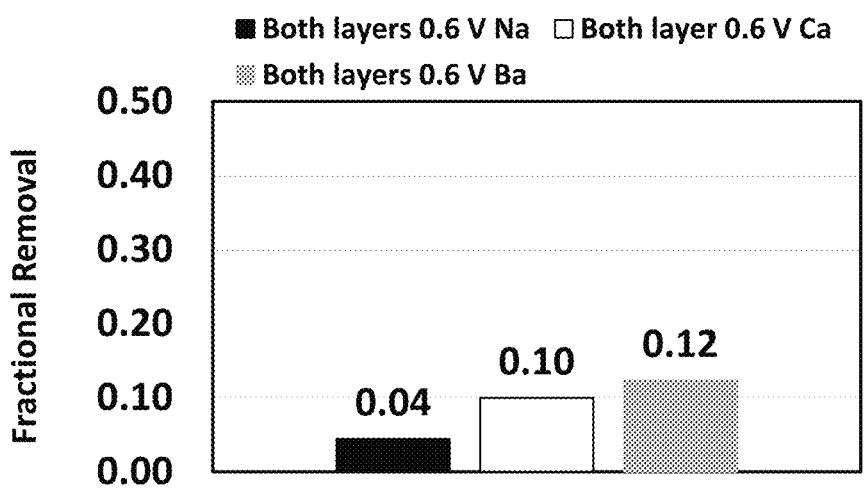

Provided in Table 2 and corresponding FIGS. 26-27, are the results from a comparison of the above prepared electrodes. The results of Experiment 1 and 2 are compared in FIG. 26A which clearly demonstrates a higher degree of selectivity is observed for the MCDI reactor comprising an electrode modified with a crosslinked PEDOT:PSS layer that was deposited on the porous electrode and positioned between the cation exchange membrane and the carbon electrode. A further comparison of Experiment 2 and 4 (FIG. 26B) shows that a decrease in the applied constant voltage from 1.2 V to 0.6 V results in a dramatic increase in selectivity towards $Ca^{2+}$ over $Na^+$. FIG. 27A further demonstrates via comparison of Experiments 5 and 6 that a decrease in voltage shows an increase in selectivity towards $Ba^{2+}$ over $Ca^{2+}$. Table 2 further shows that a cross-linked layer of PEDOT:PSS provides for an increased selectivity for $Ba^{2+}$ over both $Ca^{2+}$ and $Na^+$ when comparing Experiments 5-7 (FIG. 27B).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of forming an electrode for capacitive deionization, comprising:
   depositing a slurry onto a substrate, wherein the slurry comprises a porous material, a first crosslinkable hydrophilic polymer, and a crosslinker for the first crosslinkable hydrophilic polymer;
   annealing the slurry deposited on the substrate to create a crosslinked porous layer on the substrate;
   depositing a solution comprising an ion-exchange material, a second crosslinkable hydrophilic polymer, and a crosslinker for the second crosslinkable hydrophilic polymer onto the crosslinked porous layer;
   chemically modifying the crosslinked porous layer with iminodiacetic acid; and
   optionally annealing and/or drying the solution on the crosslinked porous layer,
   wherein the slurry and/or the solution are aqueous.

2. The method of claim 1, wherein depositing the slurry and/or solution is performed by one of spray coating, dip coating, spin coating, printing, slurry casting, or a flow-coating process.

3. The method of claim 1, wherein the porous material is selected from the group consisting of carbonaceous materials, metal organic framework, hexacyanoferrates, carbonized biomaterials and mixtures thereof.

4. The method of claim 1, wherein the first crosslinkable hydrophilic polymer is selected from the group consisting of polyvinyl alcohol, polyacrylic acid, polymethylmethacrylate, glycidylmethacrylate, partially sulfonated polystyrene polymers, polyamide, polyacrylamide, chitosan, or mixtures thereof.

5. The method of claim 4, wherein the crosslinker for the first crosslinkable hydrophilic polymer is at least one of sulfosuccinic acid, formaldehyde, glyoxal, adipic aldehyde, a dicarboxylic acid, a tricarboxylic acid, a polycarboxlic acid, anhydrides, acid chlorides, and glutaraldehyde.

6. The method of claim 1, wherein the ion-exchange material is an anion exchange polymer or a cation exchange polymer.

7. The method of claim 6, wherein the ion-exchange material is dispersed in particulate form into the solution prior to deposition of the solution onto the crosslinked porous layer.

8. The method of claim 1, wherein the second crosslinkable hydrophilic polymer is selected from the group consisting of polyvinyl alcohol, polyacrylic acid, polymethylmethacrylate, glycidylmethacrylate, partially sulfonated polystyrene polymers, polyamide, polyacrylamide, chitosan, or mixtures thereof.

9. The method of claim 8, wherein the crosslinker for the second crosslinkable hydrophilic polymer is at least one of sulfosuccinic acid, formaldehyde, glyoxal, adipic aldehyde, a dicarboxylic acid, a tricarboxylic acid, a polycarboxlic acid, anhydrides, acid chlorides, and glutaraldehyde.

10. The method of claim 1, wherein the slurry and the solution comprises no organic solvent.

11. A method of deionizing an aqueous fluid, comprising:
continuously flowing the aqueous fluid through a capacitive deionization reactor that includes at least one electrode fabricated according to claim 1 while applying a voltage between an anode and a cathode of the capacitive deionization reactor.

12. The method of claim 11, further comprising:
regenerating the anode and the cathode by reversing the applied voltage.

13. A method of deionizing an aqueous fluid, comprising:
preparing at least one electrode by:
   depositing a slurry onto a substrate, wherein the slurry comprises a porous material, a first crosslinkable hydrophilic polymer, and a crosslinker for the first crosslinkable hydrophilic polymer;
   annealing the slurry deposited on the substrate to create a crosslinked porous layer on the substrate,
   depositing a solution comprising an ion-exchange material, a second crosslinkable hydrophilic polymer, and a crosslinker for the second crosslinkable hydrophilic polymer onto the crosslinked porous layer;
   chemically modifying the crosslinked porous layer with iminodiacetic acid; and
   optionally annealing and/or drying the solution on the crosslinked porous layer,
   wherein the slurry and/or the solution are aqueous; and
continuously flowing the aqueous fluid through a capacitive deionization reactor that includes the at least one electrode fabricated to selectively remove a targeted ion, while applying a voltage between an anode and a cathode of the capacitive deionization reactor.

14. The method of claim 13, wherein the targeted ion selectively removed by the capacitive deionization reactor is at least one of monovalent cations, monovalent anions, multivalent cations and multivalent anions.

15. The method of claim 13, wherein the capacitive deionization reactor is configured as a flow-by, flow-through, flow, faradaic, inverse, hybrid, or intercalating capacitive deionization reactor.

16. An apparatus for capacitive deionization reactions comprising:
a cathode;
an anode,
wherein at least one of the anode and/or cathode is a crosslinked porous electrode formed by the method of claim 1,
wherein the crosslinked porous electrode comprises substrate, a first porous layer deposited on the substrate, and a second layer deposited on the first porous layer;
wherein the first porous layer comprises a porous material and a crosslinked hydrophilic polymer, and the second layer comprises an ion exchange material, a crosslinked or non-crosslinked hydrophilic polymer, and optionally a crosslinker.

17. The apparatus of claim 16, wherein the crosslinked ion-exchange layer is selective for at least one of monovalent cations, monovalent anions, multivalent cations and multivalent anions.

* * * * *